(12) United States Patent
Xiang et al.

(10) Patent No.: US 12,250,165 B2
(45) Date of Patent: Mar. 11, 2025

(54) INFORMATION SENDING AND RECEIVING METHOD, DEVICE, AND APPARATUS

(71) Applicant: Huawei Technologies Co., Ltd., Shenzhen (CN)

(72) Inventors: Zhengzheng Xiang, Shanghai (CN); Dehua Zhao, Shenzhen (CN); Tianze Li, Shanghai (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 506 days.

(21) Appl. No.: 17/199,761

(22) Filed: Mar. 12, 2021

(65) Prior Publication Data

US 2021/0203462 A1    Jul. 1, 2021

Related U.S. Application Data

(63) Continuation of application No. PCT/CN2019/099633, filed on Aug. 7, 2019.

(30) Foreign Application Priority Data

Sep. 14, 2018 (CN) .......................... 201811075068.0

(51) Int. Cl.
*H04W 72/04* (2023.01)
*H04L 5/00* (2006.01)

(52) U.S. Cl.
CPC ........... *H04L 5/0048* (2013.01); *H04W 72/04* (2013.01)

(58) Field of Classification Search
None
See application file for complete search history.

(56) References Cited

U.S. PATENT DOCUMENTS

| 2018/0048446 | A1* | 2/2018 | Jiang | H04L 5/0051 |
| 2020/0052843 | A1* | 2/2020 | Cheng | H04W 72/20 |

(Continued)

FOREIGN PATENT DOCUMENTS

| CN | 102957654 A | 3/2013 |
| CN | 106656441 A | 5/2017 |

(Continued)

OTHER PUBLICATIONS

Panasonic, "Discussion on physical layer structures and procedure(s) of NR sidelink", 3GPP TSG RAN WG1 Meeting #94, R1-1808647, Gothenburg, Sweden, Aug. 20-24, 2018, 4 pages.

(Continued)

*Primary Examiner* — Anh Vu H Ly
(74) *Attorney, Agent, or Firm* — Slater Matsil, LLP

(57) ABSTRACT

An information sending method, an information receiving method, a device, and an apparatus are disclosed. The information sending method includes: determining, by a first terminal device based on first information, at least one of a quantity or a position of m DMRSs carried on a PSSCH, where m is a positive integer, and the first information includes at least one of a subcarrier spacing, duration of the PSSCH, or a channel coherence time; and sending, by the first terminal device, the m DMRSs to a second terminal device. In addition, when the DMRS on the PSSCH is determined, a reference channel coherence time may be selected. For example, a time interval between two configured adjacent DMRSs may be less than or equal to the channel coherence time.

20 Claims, 8 Drawing Sheets

(56) References Cited

U.S. PATENT DOCUMENTS

| | | | | |
|---|---|---|---|---|
| 2021/0029688 | A1* | 1/2021 | Zhang | H04L 5/0044 |
| 2021/0176720 | A1* | 6/2021 | Chae | H04W 92/18 |
| 2021/0243728 | A1* | 8/2021 | Lee | H04L 27/2602 |
| 2021/0266868 | A1* | 8/2021 | Shin | H04W 72/23 |
| 2021/0266895 | A1* | 8/2021 | Wang | H04W 72/20 |
| 2021/0289496 | A1* | 9/2021 | Lee | H04W 74/0808 |
| 2021/0297221 | A1* | 9/2021 | Lee | H04L 1/1864 |

FOREIGN PATENT DOCUMENTS

| | | | |
|---|---|---|---|
| CN | 106717089 A | 5/2017 | |
| CN | 107736064 A | 2/2018 | |
| CN | 107979452 A | 5/2018 | |
| CN | 108023698 A | 5/2018 | |
| CN | 108141340 A | 6/2018 | |
| CN | 108174445 A | 6/2018 | |
| CN | 108282287 A | 7/2018 | |
| CN | 108347767 A | 7/2018 | |
| CN | 108353063 A | 7/2018 | |
| CN | 110912659 A | 3/2020 | |
| EP | 3373673 A1 | 9/2018 | |
| EP | 4221064 A2 | 8/2023 | |
| WO | 2017178993 A1 | 10/2017 | |
| WO | WO-2020033719 A1 * | 2/2020 | H04L 1/1812 |

OTHER PUBLICATIONS

Ericsson, "Link level simulations of DMRS design for NR V2X", 3GPP TSG-RAN WG1 Meeting #94, R1-1809305, Gothenburg, Sweden, Aug. 20-24, 2018, 3 pages.

Huawei et al., "DMRS enhancement for V2V", 3GPP TSG RAN WG1 Meeting #83, R1-156908, Anaheim, CA, USA, Nov. 15-22, 2015, 8 pages.

Huawei et al., "DMRS enhancement for V2V", 3GPP TSG RAN WG1 Meeting #82bis, R1-155646, Malmo, Sweden, Oct. 5-9, 2015, 4 pages.

3rd Generation Partnership Project; Technical Specification Group Radio Access Network; NR; Physical channels and modulation (Release 15), 3GPP TS 38.211 V15.2.0 (Jun. 2018), 96 pages.

3rd Generation Partnership Project; Technical Specification Group Radio Access Network; NR; Physical layer procedures for control (Release 15), 3GPP TS 38.213 V15.6.0 (Jun. 2019), 107 pages.

3rd Generation Partnership Project; Technical Specification Group Radio Access Network; NR; Physical layer procedures for data (Release 15), 3GPP TS 38.214 V15.6.0 (Jun. 2019), 105 pages.

ZTE, "Discussion on NR Sidelink Physical layer structures", 3GPP TSG RAN WG1 Meeting #94, R1-1808603, Gothenburg, Sweden, Aug. 20-24, 2018, 4 pages.

Oppo, "Discussion of physical layer structure and procedure for NR-V2X", 3GPP TSG RAN WG1 Meeting #94, R1-1808876, Gothenburg, Sweden, Aug. 20-24, 2018, 4 pages.

Catt et al., "DMRS enhancement for V2V", 3GPP TSG RAN WG1 Meeting #84, R1-161197, St. Julian's, Malta, Feb. 15-19, 2016, 4 pages.

Huawei et al., "DMRS enhancement for V2V", 3GPP TSG RAN WG1 Meeting #82, R1-153801, Beijing, China, Aug. 24-28, 2015, 4 pages.

Intel Corporation, "Sidelink DMRS enhancements for V2V communication", 3GPP TSG RAN WG1 Meeting #84 R1-160430, St Julians, Malta, Feb. 15-19, 2016, 8 pages.

Vivo, "Physical layer structure and procedure for NR sidelink", 3GPP TSG RAN WG1, Meeting #94, R1-1808243, Gothenburg, Sweden, Aug. 20-24, 2018, 5 pages.

Mediatek Inc., "On NR V2X Physical Channel Design Issues", 3GPP TSG RAN WG1 Meeting #94, R1-1808280, Gothenburg, Sweden, Aug. 20-24, 2018, 5 pages.

LG Electronics, "Remaining details on DMRS for PSCCH and PSSCH", 3GPP TSG RAN WG1 Meeting #86, R1-166821, Gothenburg, Sweden, Aug. 22-26, 2016, 3 pages.

* cited by examiner

PUSCH frame structure

PSSCH frame structure

Front-loaded DMRS configuration solution

Non-front-loaded DMRS configuration solution

INFORMATION SENDING AND RECEIVING METHOD, DEVICE, AND APPARATUS

CROSS-REFERENCE TO RELATED APPLICATIONS

This application is a continuation of International Application No. PCT/CN2019/099633, filed on Aug. 7, 2019, which claims priority to claims priority to Chinese Patent Application No. 201811075068.0, filed on Sep. 14, 2018. The disclosures of the aforementioned applications are hereby incorporated by reference in their entireties.

TECHNICAL FIELD

This application relates to the field of communications technologies, and in particular, to an information sending method, an information receiving method, a device, and an apparatus.

BACKGROUND

Vehicle-to-everything (V2X) is a key technology of a future intelligent transport system (ITS), and includes vehicle-to-vehicle (V2V) direct communication, vehicle-to-infrastructure (V2I) direct communication, vehicle-to-pedestrian (V2P) direct communication, and vehicle-to-network (V2N) communication interaction. The V2X technology can well adapt to different application scenarios. Traffic information, such as real-time road conditions, roads, and pedestrians, can be obtained through communication, greatly improving traffic safety, reducing congestion, and improving traffic efficiency. In addition, the V2X technology provides a basic platform for easy implementation of autonomous driving, intelligent transport, and internet of vehicles innovation with low costs.

In the V2X, a physical sidelink shared channel (PSSCH) may be used for communication between terminal devices. In the long term evolution (LTE) standard, a demodulation reference signal (DMRS) configuration of the PSSCH basically inherits a DMRS configuration solution of a physical uplink shared channel (PUSCH), and a difference lies only in that, to cope with a high mobility scenario, a quantity of orthogonal frequency division multiplexing (OFDM) symbols occupied by DMRSs in one slot is increased from 2 in the PUSCH to 4 in the PSSCH. FIG. 1 provides comparison between positions of DMRSs on a PUSCH in one slot and positions of DMRSs on a PSSCH in one slot in the LTE standard. In FIG. 1, a box with diagonal lines represents a position of a DMRS.

However, in a new radio (NR) system of a 5th generation (5G) mobile communications technology, no DMRS configuration solution is provided for the PSSCH.

SUMMARY

Embodiments of this application provide an information sending method, an information receiving method, a device, and an apparatus, to provide a solution for configuring a DMRS on a PSSCH in a V2X in an NR system.

According to a first aspect, an information sending method is provided. The method includes: A first terminal device determines, based on first information, at least one of a quantity or a position of m DMRSs carried on a PSSCH. m is a positive integer, and the first information includes at least one of a subcarrier spacing, duration of the PSSCH, or a channel coherence time. The first terminal device sends the m DMRSs to a second terminal device.

The method may be performed by a first communications apparatus. The first communications apparatus may be a terminal device or a communications apparatus that can support a terminal device in implementing a function required in the method. For example, the first communications apparatus is the first terminal device. Certainly, the first communications apparatus may alternatively be another communications apparatus, for example, a chip system.

In the embodiments of this application, at least one of a quantity or a position of m DMRSs on a PSSCH may be determined based on at least one of a subcarrier spacing, duration of the PSSCH, or a channel coherence time, to provide a solution of configuring a DMRS on a PSSCH in V2X in the NR system. In addition, when the DMRS on the PSSCH is determined, a reference channel coherence time may be selected. For example, a time interval between two configured adjacent DMRSs may be less than or equal to the channel coherence time, so that accuracy of performing channel estimation based on a DMRS can be improved.

In a possible design, the first information includes the subcarrier spacing, the duration of the PSSCH, and the channel coherence time, and that a first terminal device determines, based on first information, at least one of a quantity or a position of m DMRSs carried on a PSSCH includes: The first terminal device determines, based on the subcarrier spacing, duration of one symbol occupied by the PSSCH. The first terminal device determines a time interval between two adjacent DMRSs in the m DMRSs based on the duration of the one symbol and the channel coherence time. The first terminal device determines the at least one of the quantity or the position of the m DMRSs based on the duration of the PSSCH and the time interval.

The first terminal device or the second terminal device may directly calculate the at least one of the quantity or the position of the m DMRSs based on the first information in a relatively direct manner. In addition, in this embodiment of this application, the channel coherence time is further considered, and a distribution interval, in time domain, of the DMRSs is less than or equal to the channel coherence time, so that a time-varying channel can be relatively accurately estimated.

In a possible design, that a first terminal device determines, based on first information, at least one of a quantity or a position of m DMRSs carried on a PSSCH includes: The first terminal device determines the at least one of the quantity or the position of the m DMRSs based on the first information and a preconfigured correspondence between a DMRS and at least one of the subcarrier spacing, the duration of the PSSCH, or the channel coherence time.

In other words, the correspondence between a DMRS and at least one of the subcarrier spacing, the duration of the PSSCH, or the channel coherence time is preconfigured, so that the first terminal device or the second terminal device only needs to know the first information, and then may directly determine the at least one of the quantity or the position of the m DMRSs based on the first information and the correspondence. This is relatively simple, and helps simplify implementation of a terminal device.

In a possible design, the method further includes: The first terminal device determines that the PSSCH and a PSCCH that is transmitted by the first terminal device are in a TDM mode or an FDM mode.

When the PSSCH and the PSCCH transmitted by the terminal device are in different modes, the position of the m DMRSs may be different. Therefore, the first terminal device or the second terminal device may determine a mode of the PSSCH and the PSCCH that is transmitted by the terminal device.

In a possible design, the PSSCH and the PSCCH that is transmitted by the second terminal device are in the TDM mode; and in this case, the first symbol in the PSSCH is not occupied by AGC, and the first DMRS in time domain in the m DMRSs occupies the first symbol in the PSSCH; or the first symbol in the PSSCH is occupied by AGC, and the first DMRS in time domain in the m DMRSs occupies the second symbol in the PSSCH.

If the PSSCH and the PSCCH that is transmitted by the terminal device are in the TDM mode, to accelerate a decoding process and reduce a latency, a front-loaded DMRS configuration solution may be used. In other words, the first DMRS in time domain in the m DMRSs may be placed in the forefront of the PSSCH as much as possible. This helps accelerate the decoding process and reduce the transmission latency. However, based on a requirement, in the NR system, the first symbol in the PSSCH may be configured as data or AGC. Therefore, if the first symbol in the PSSCH is occupied by AGC, the first DMRS in time domain in the m DMRSs occupies the second symbol in the PSSCH; or if the first symbol in the PSSCH is not occupied by AGC, the first DMRS in time domain in the m DMRSs occupies the first symbol in the PSSCH. In this way, the DMRS is front-loaded as much as possible, and an existing AGC distribution manner is also compatible.

In a possible design, the PSSCH and the PSCCH that is transmitted by the second terminal device are in the FDM mode, the first DMRS in time domain in the m DMRSs occupies a symbol whose sequence number is n in the PSSCH, total duration of n symbols whose sequence numbers are 0 to n−1 in the PSSCH is less than or equal to the channel coherence time, where n is a positive integer.

Considering that the front-loaded DMRS configuration solution may cause relatively large DMRS overheads, and if the PSSCH and the PSCCH are in the FDM mode, the decoding process may no longer be capable of being accelerated if the foregoing front-loaded DMRS configuration solution continues to be used, this embodiment of this application proposes the following solution: If the PSSCH and the PSCCH are in the FDM mode, the front-loaded DMRS configuration solution may not be used, and the position of the DMRSs is rearranged. If the PSSCH and the PSCCH are in the FDM mode, the first DMRS in time domain in the m DMRSs occupies the symbol whose sequence number is n in the PSSCH, and the total duration of the n symbols whose sequence numbers are 0 to n−1 in the PSSCH is less than or equal to the channel coherence time. In this way, the first DMRS in time domain in the m DMRSs can cover the symbols whose sequence numbers are 0 to n−1 in the PSSCH. In other words, the entire PSSCH can be covered by using the m DMRSs. In addition, a manner in which the DMRS is front-loaded is not used, helping reduce DMRS overheads to some extent.

In a possible design, on the PSSCH, a time interval between two adjacent DMRSs in the m DMRSs is less than or equal to the channel coherence time.

In this way, the time interval between two adjacent DMRSs in the m DMRSs is less than or equal to the channel coherence time, and this may improve accuracy of performing channel estimation based on the DMRSs.

According to a second aspect, an information receiving method is provided. The method includes: A second terminal device determines, based on first information, at least one of a quantity or a position of m DMRSs carried on a PSSCH. m is a positive integer, and the first information includes at least one of a subcarrier spacing, duration of the PSSCH, or a channel coherence time. The second terminal device receives the m DMRSs from a first terminal device.

The method may be performed by a second communications apparatus. The second communications apparatus may be a terminal device or a communications apparatus that can support a terminal device in implementing a function required in the method. For example, the second communications apparatus is the second terminal device. Certainly, the second communications apparatus may alternatively be another communications apparatus, for example, a chip system.

In a possible design, the first information includes the subcarrier spacing, the duration of the PSSCH, and the channel coherence time, and that a second terminal device determines, based on first information, at least one of a quantity or a position of m DMRSs carried on a PSSCH includes: The second terminal device determines, based on the subcarrier spacing, duration of one symbol occupied by the PSSCH. The second terminal device determines a time interval between two adjacent DMRSs in the m DMRSs based on the duration of the one symbol and the channel coherence time. The second terminal device determines the at least one of the quantity or the position of the m DMRSs based on the duration of the PSSCH and the time interval.

In a possible design, that a second terminal device determines, based on first information, at least one of a quantity or a position of m DMRSs carried on a PSSCH includes: The second terminal device determines the at least one of the quantity or the position of the m DMRSs based on the first information and a preconfigured correspondence between a DMRS and at least one of the subcarrier spacing, the duration of the PSSCH, or the channel coherence time.

In a possible design, the method further includes: The second terminal device determines that the PSSCH and a PSCCH that is transmitted by the second terminal device are in a TDM mode or an FDM mode.

In a possible design, the PSSCH and the PSCCH that is transmitted by the second terminal device are in the TDM mode; and in this case, the first symbol in the PSSCH is not occupied by AGC, and the first DMRS in time domain in the m DMRSs occupies the first symbol in the PSSCH; or the first symbol in the PSSCH is occupied by AGC, and the first DMRS in time domain in the m DMRSs occupies the second symbol in the PSSCH.

In a possible design, the PSSCH and the PSCCH that is transmitted by the second terminal device are in the FDM mode, the first DMRS in time domain in the m DMRSs occupies a symbol whose sequence number is n in the PSSCH, total duration of n symbols whose sequence numbers are 0 to n−1 in the PSSCH is less than or equal to the channel coherence time, where n is a positive integer.

In a possible design, on the PSSCH, a time interval between two adjacent DMRSs in the m DMRSs is less than or equal to the channel coherence time.

For technical effects brought by the second aspect or various possible designs of the second aspect, refer to related descriptions of the first aspect or the various designs of the first aspect. Details are not described again.

According to a third aspect, a first communications apparatus is provided. The communications apparatus is, for example, the first communications apparatus described above, for example, the first terminal device. The communications apparatus has functions of implementing the first terminal device in the foregoing method designs. The communications apparatus includes, for example, a processor and a transceiver that are coupled to each other. The transceiver is, for example, implemented as a communications interface. The communications interface herein may be understood as a radio frequency transceiver component in the first terminal device.

The processor is configured to determine, based on first information, at least one of a quantity or a position of m DMRSs carried on a PSSCH, where m is a positive integer, and the first information includes at least one of a subcarrier spacing, duration of the PSSCH, or a channel coherence time.

The transceiver is configured to send the m DMRSs to a second terminal device.

In a possible design, the first information includes the subcarrier spacing, the duration of the PSSCH, and the channel coherence time, and the processor is configured to determine, based on the first information in the following manner, the at least one of the quantity or the position of the m DMRSs carried on the PSSCH: determining, based on the subcarrier spacing, duration of one symbol occupied by the PSSCH; determining a time interval between two adjacent DMRSs in the m DMRSs based on the duration of the one symbol and the channel coherence time; and determining the at least one of the quantity or the position of the m DMRSs based on the duration of the PSSCH and the time interval.

In a possible design, the processor is configured to determine, based on the first information in the following manner, the at least one of the quantity or the position of the m DMRSs carried on the PSSCH: determining the at least one of the quantity or the position of the m DMRSs based on the first information and a preconfigured correspondence between a DMRS and at least one of the subcarrier spacing, the duration of the PSSCH, or the channel coherence time.

In a possible design, the processor is further configured to determine that the PSSCH and a physical sidelink control channel PSCCH that is transmitted by the terminal device are in a time division multiplexing TDM mode or a frequency division multiplexing FDM mode.

In a possible design, the PSSCH and the PSCCH that is transmitted by the terminal device are in the TDM mode; and in this case, the first symbol in the PSSCH is not occupied by automatic gain control AGC, and the first DMRS in time domain in the m DMRSs occupies the first symbol in the PSSCH; or the first symbol in the PSSCH is occupied by AGC, and the first DMRS in time domain in the m DMRSs occupies the second symbol in the PSSCH.

In a possible design, the PSSCH and the PSCCH that is transmitted by the terminal device are in the FDM mode, the first DMRS in time domain in the m DMRSs occupies a symbol whose sequence number is n in the PSSCH, total duration of n symbols whose sequence numbers are 0 to n−1 in the PSSCH is less than or equal to the channel coherence time, where n is a positive integer.

In a possible design, on the PSSCH, a time interval between two adjacent DMRSs in the m DMRSs is less than or equal to the channel coherence time.

For technical effects brought by the third aspect or various possible designs of the third aspect, refer to related descriptions of the first aspect or the various designs of the first aspect. Details are not described again.

According to a fourth aspect, a second communications apparatus is provided. The communications apparatus is, for example, the second communications apparatus described above, for example, the second terminal device. The communications apparatus has functions of implementing the second terminal device in the foregoing method designs. The communications apparatus includes, for example, a processor and a transceiver that are coupled to each other. The transceiver is, for example, implemented as a communications interface. The communications interface herein may be understood as a radio frequency transceiver component in the second terminal device.

The processor is configured to determine, based on first information, at least one of a quantity or a position of m DMRSs carried on a PSSCH, where m is a positive integer, and the first information includes at least one of a subcarrier spacing, duration of the PSSCH, or a channel coherence time.

The transceiver is configured to receive the m DMRSs from a first terminal device.

In a possible design, the first information includes the subcarrier spacing, the duration of the PSSCH, and the channel coherence time, and the processor is configured to determine, based on the first information in the following manner, the at least one of the quantity or the position of the m DMRSs carried on the PSSCH: determining, based on the subcarrier spacing, duration of one symbol occupied by the PSSCH; determining a time interval between two adjacent DMRSs in the m DMRSs based on the duration of the one symbol and the channel coherence time; and determining the at least one of the quantity or the position of the m DMRSs based on the duration of the PSSCH and the time interval.

In a possible design, the processor is configured to determine, based on the first information in the following manner, the at least one of the quantity or the position of the m DMRSs carried on the PSSCH: determining the at least one of the quantity or the position of the m DMRSs based on the first information and a preconfigured correspondence between a DMRS and at least one of the subcarrier spacing, the duration of the PSSCH, or the channel coherence time.

In a possible design, the processor is further configured to determine that the PSSCH and a physical sidelink control channel PSCCH that is transmitted by the terminal device are in a time division multiplexing TDM mode or a frequency division multiplexing FDM mode.

In a possible design, the PSSCH and the PSCCH that is transmitted by the terminal device are in the TDM mode; and in this case, the first symbol in the PSSCH is not occupied by AGC, and the first DMRS in time domain in the m DMRSs occupies the first symbol in the PSSCH; or the first symbol in the PSSCH is occupied by AGC, and the first DMRS in time domain in the m DMRSs occupies the second symbol in the PSSCH.

In a possible design, the PSSCH and the PSCCH that is transmitted by the terminal device are in the FDM mode, the first DMRS in time domain in the m DMRSs occupies a symbol whose sequence number is n in the PSSCH, total duration of n symbols whose sequence numbers are 0 to n−1 in the PSSCH is less than or equal to the channel coherence time, where n is a positive integer.

In a possible design, on the PSSCH, a time interval between two adjacent DMRSs in the m DMRSs is less than or equal to the channel coherence time.

For technical effects brought by the fourth aspect or various possible designs of the fourth aspect, refer to related descriptions of the second aspect or the various designs of the second aspect. Details are not described again.

According to a fifth aspect, a third communications apparatus is provided. The communications apparatus is, for example, the first communications apparatus described above, for example, the first terminal device. The communications apparatus has functions of implementing the first terminal device in the foregoing method designs. The functions may be implemented by hardware, or implemented by hardware executing corresponding software. The hardware or the software includes one or more modules corresponding to the foregoing functions.

In a possible design, a specific structure of the communications apparatus may include a processing module and a transceiver module. The processing module and the transceiver module may perform corresponding functions in the method provided in any one of the first aspect or the possible implementations of the first aspect.

According to a sixth aspect, a fourth communications apparatus is provided. The communications apparatus is, for example, the second communications apparatus described above, for example, the terminal device. The communications apparatus has functions of implementing the second terminal device in the foregoing method designs. The functions may be implemented by hardware, or implemented by hardware executing corresponding software. The hardware or the software includes one or more modules corresponding to the foregoing functions.

In a possible design, a specific structure of the communications apparatus may include a processing module and a transceiver module. The processing module and the transceiver module may perform corresponding functions in the method provided in any one of the second aspect or the possible implementations of the second aspect.

According to a seventh aspect, a fifth communications apparatus is provided. The communications apparatus may be the first communications apparatus in the foregoing method designs, for example, the first terminal device, or a chip disposed in the first terminal device. The communications apparatus includes: a memory, configured to store computer-executable program code; and a processor, where the processor is coupled to the memory. The program code stored in the memory includes instructions, and when the processor executes the instructions, the fifth communications apparatus is enabled to perform the method in any one of the first aspect or the possible implementations of the first aspect.

The fifth communications apparatus may further include a communications interface. If the fifth communications apparatus is the first terminal device, the communications interface may be a transceiver in the first terminal device, for example, a radio frequency transceiver component in the first terminal device; or if the fifth communications apparatus is a chip disposed in the first terminal device, the communications interface may be an input/output interface of the chip, for example, an input/output pin.

According to an eighth aspect, a sixth communications apparatus is provided. The communications apparatus may be the second communications apparatus in the foregoing method designs, for example, the terminal device, or a chip disposed in the second terminal device. The communications apparatus includes: a memory, configured to store computer-executable program code; and a processor, where the processor is coupled to the memory. The program code stored in the memory includes instructions, and when the processor executes the instructions, the sixth communications apparatus is enabled to perform the method in any one of the second aspect or the possible implementations of the second aspect.

The sixth communications apparatus may further include a communications interface. If the sixth communications apparatus is the second terminal device, the communications interface may be a transceiver in the second terminal device, for example, a radio frequency transceiver component in the second terminal device; or if the sixth communications apparatus is a chip disposed in the second terminal device, the communications interface may be an input/output interface of the chip, for example, an input/output pin.

According to a ninth aspect, a first communications system is provided. The communications system may include the first communications apparatus according to the third aspect, the third communications apparatus according to the fifth aspect, or the fifth communications apparatus according to the seventh aspect, and include the second communications apparatus according to the fourth aspect, the fourth communications apparatus according to the sixth aspect, or the sixth communications apparatus according to the eighth aspect.

According to a tenth aspect, a computer-readable storage medium is provided. The computer-readable storage medium stores instructions, and when the instructions are run on a computer, the computer is enabled to perform the method according to any one of the first aspect or the possible designs of the first aspect.

According to an eleventh aspect, a computer storage medium is provided. The computer-readable storage medium stores instructions, and when the instructions are run on a computer, the computer is enabled to perform the method according to any one of the second aspect or the possible designs of the second aspect.

According to a twelfth aspect, a computer program product including instructions is provided. The computer program product stores the instruction, and when the instructions are run on a computer, the computer is enabled to perform the method according to any one of the first aspect or the possible designs of the first aspect.

According to a thirteenth aspect, a computer program product including instructions is provided. The computer program product stores the instructions, and when the instructions are run on a computer, the computer is enabled to perform the method according to any one of the second aspect or the possible designs of the second aspect.

A solution for configuring, in an NR system, a DMRS on a PSSCH in V2X is provided in the embodiments of this application. In addition, when the DMRS on the PSSCH is determined, a reference channel coherence time may be selected, so that accuracy of performing channel estimation based on the DMRS can be improved.

DETAILED DESCRIPTION OF ILLUSTRATIVE EMBODIMENTS

Figure 1:
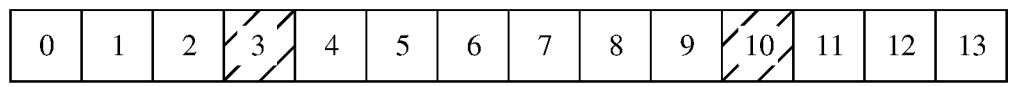
FIG. 1 is a schematic diagram of a DMRS configuration solution of a PUSCH and a PSSCH in an LTE system.
Figure 1:
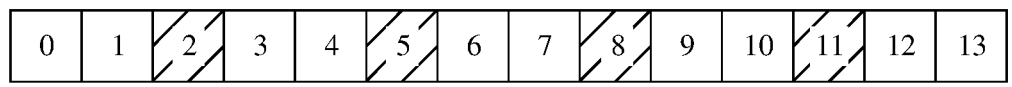

To make objectives, technical solutions and advantages of embodiments of this application clearer, the following further describes the embodiments of this application in detail with reference to the accompanying drawings.

The following describes some terms in the embodiments of this application, to facilitate understanding of a person skilled in the art.

(1) A terminal device includes a device that provides a user with voice and/or data connectivity, for example, may include a handheld device having a wireless connection function, or a processing device connected to a wireless modem. The terminal device may communicate with a core network through a radio access network (RAN), and exchange a voice and/or data with the RAN. The terminal device may include user equipment (UE), a wireless terminal device, a mobile terminal device, a subscriber unit, a subscriber station, a mobile station, a mobile station (mobile), a remote station, an access point (AP), a remote terminal device, an access terminal device, a user terminal (user terminal) device, a user agent, a user device, or the like. For example, the terminal device may include a mobile phone (which is also referred to as a "cellular" phone), a computer having a mobile terminal device, a portable, pocket-sized, handheld, computer built-in, or vehicle-mounted mobile apparatus, and a smart wearable device. For example, the terminal device is a device such as a personal communications service (PCS) phone, a cordless phone, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device may be an information sensing device, for example, a barcode, radio frequency identification (RFID), a sensor, a global positioning system (GPS), or a laser scanner.

By way of example rather than limitation, in the embodiments of this application, the terminal device may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that can be directly worn by a user or integrated into clothes or an accessory of a user. The wearable device is not only a hardware device, but is used to implement powerful functions through software support, data exchange, and cloud interaction. In a broad sense, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

(2) A network device, for example, includes an access network (AN) device such as a base station (such as an access point), and may be a device that is in an access network and that communicates with a wireless terminal device over an air interface through one or more cells. The network device may be configured to: mutually convert a received over-the-air frame and an internet protocol (IP) packet, and serve as a router between the terminal device and a rest portion of the access network, where the rest portion of the access network may include an IP network. The network device may further coordinate attribute management of the air interface. For example, the network device may include an evolved NodeB (NodeB or eNB or e-NodeB, evolutional NodeB) in a long term evolution (LTE) system or an LTE-advanced (LTE-A) system, may include a next generation NodeB (gNB) in a 5th generation (5G) new radio (NR) system, or may include a centralized unit (CU) and a distributed unit (DU) in a cloud access network (CloudRAN) system. This is not limited in the embodiments of this application.

(3) V2X is a key technology of a future ITS, and includes direct communication of V2V, V2I, and V2P, and communication interaction of V2N. The V2X technology can well adapt to different application scenarios. Traffic information, such as real-time road conditions, roads, and pedestrians, can be obtained through communication, greatly improving traffic safety, reducing congestion, and improving traffic efficiency. In addition, the V2X technology provides a basic platform for easy implementation of autonomous driving, intelligent transport, and internet of vehicles innovation with low costs. The V2X is a communication technology specially designed for a high-speed mobile application. According to latest regulations, in the 6 GHz frequency band, V2X direct communication needs to support a maximum relative speed of 500 km/h.

(4) The channel coherence time may be represented by $T_C$, and is a statistical average value of time intervals in which channel impulse responses remain unchanged. The channel coherence time is inversely proportional to Doppler spread, and describes, in time domain, a time-varying characteristic of frequency dispersion of a channel. Usually, the following formula is used to calculate the channel coherence time $T_C$:

$$T_C = \sqrt{\frac{9}{16\pi f_d^2}} = \frac{0.423}{f_d} \quad \text{(Formula 1)}$$

$$f_d = \frac{v}{c} f_c \quad \text{(Formula 2)}$$

where $f_d$ is a maximum Doppler frequency, v is a maximum relative speed between a transmit end and a receive end, $f_c$ is a carrier frequency, and c is a speed of light.

According to the formula 1 and the formula 2, it can be calculated that, when the carrier frequency is 6 GHz and the maximum relative speed between the transmit end and the receive end is 280 km/h, the corresponding channel coherence time is 0.272 ms, and when the maximum relative speed between the transmit end and the receive end is increased to 500 km/h, the corresponding channel coherence time is decreased to 0.152 ms.

(5) A DMRS is used as a main reference signal for estimating a channel feature, and a configuration structure and density of the DMRS directly affect an estimation capability of a time-varying channel. To relatively accurately estimate the time-varying channel, in this embodiment of this application, a distribution interval of the DMRS in time domain may be less than or equal to the channel coherence time.

(6) A subcarrier spacing (SCS) is a value of a spacing between center positions or peak positions of two adjacent subcarriers in frequency domain in an OFDM system. For example, the SCS may be 15 kHz, 30 kHz, 60 kHz, 120 kHz, 240 kHz, 480 kHz, or the like. For example, different subcarrier spacings may be integer multiples of 2. It may be understood that the SCS may alternatively be designed to be another value. For example, a subcarrier spacing in the LTE system is 15 kHz, and a subcarrier spacing in the NR system may be 15 kHz, 30 kHz, 60 kHz, 120 kHz, or the like.

For the subcarrier spacing, refer to the following Table 1:

TABLE 1

| μ | $\Delta f = 2^\mu \cdot 15[kHz]$ |
|---|---|
| 0 | 15 |
| 1 | 30 |
| 2 | 60 |
| 3 | 120 |
| 4 | 240 |

μ is used to indicate a subcarrier spacing. For example, when μ=0, the subcarrier spacing is 15 kHz, and when μ=1, the subcarrier spacing is 30 kHz. Lengths of slots corresponding to different subcarrier spacings are different. A length of a slot corresponding to a subcarrier spacing of 15 kHz is 0.5 ms, a length of a slot corresponding to a subcarrier spacing of 60 kHz is 0.125 ms, and the like. Correspondingly, one symbol corresponding to different subcarrier spacings may alternatively have different lengths.

(7) The terms "system" and "network" may be used interchangeably in the embodiments of this application. "A plurality of" refers to two or more than two. In view of this, "a plurality of" may also be understood as "at least two" in the embodiments of this application. "At least one" may be understood as one or more, for example, one, two, or more. For example, including at least one refers to including one, two, or more, and which one, two, or more is included is not limited. For example, if at least one of A, B, and C is included, A, B, C, A and B, A and C, B and C, or A, B, and C may be included. "and/or" describes an association relationship between associated objects and represents that three relationships may exist. For example, A and/or B may represent three cases: There is only A, there are both A and B, and there is only B. In addition, the character "/" generally indicates an "or" relationship between the associated objects unless otherwise specified.

Unless otherwise specified, ordinal numbers such as "first" and "second" mentioned in the embodiments of this application are used to distinguish between a plurality of objects, and are not used to limit a sequence, a time sequence, priorities, or importance of the plurality of objects. For example, a first terminal device and a second terminal device are merely intended to distinguish between different terminal devices, but are not intended to limit functions, priorities, importance, or the like of the two terminal devices.

First, technical features in the embodiments of this application are described.

In V2X, a PSSCH may be used for communication between terminal devices. Because a sidelink (SL) used for V2X communication uses an uplink (UL) time-frequency resource, in an LTE system, a DMRS configuration of the PSSCH basically inherits a DMRS configuration solution of a PUSCH, and a difference lies only in that: To cope with a high mobility scenario, a quantity of OFDM symbols occupied by DMRSs in one slot is increased from 2 in the PUSCH to 4 in the PSSCH. FIG. 1 provides comparison between positions of DMRSs on a PUSCH in one slot and positions of DMRSs on a PSSCH in one slot in the LTE standard. In FIG. 1, a box with diagonal lines represents a symbol of a DMRS. By increasing DMRS distribution density in time domain, V2X in the LTE system can well meet a high-speed application requirement.

However, in a 5G NR system, for the PSSCH, no DMRS configuration solution has been provided.

In view of this, technical solutions in the embodiments of this application are provided. In the embodiments of this application, at least one of a quantity or a position of m DMRSs on a PSSCH may be determined based on at least one of a subcarrier spacing, duration of the PSSCH, or a channel coherence time, to provide a solution of configuring a DMRS on a PSSCH in V2X in the NR system.

The technical solutions provided in the embodiments of this application may be used in the 5G NR system, or may be used in the LTE system, or may be used in a next-generation mobile communications system or another similar communications system. This is not specifically limited.

Figure 2:
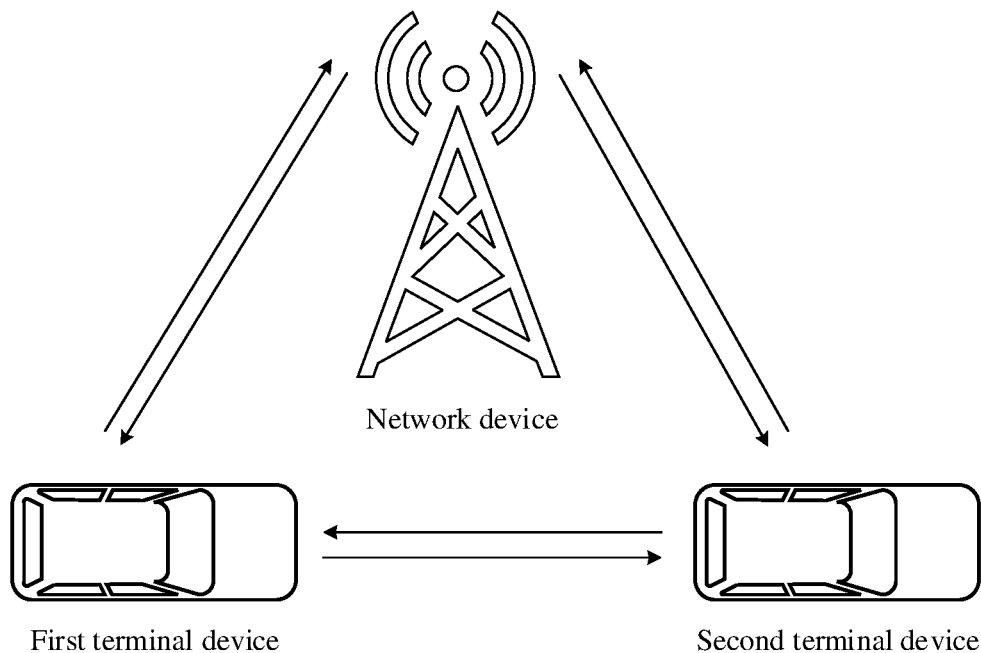
FIG. 2 is a schematic diagram of an application scenario according to an embodiment of this application.

The following describes a network architecture to which an embodiment of this application is used. Refer to FIG. 2.

FIG. 2 includes a network device and two terminal devices. The two terminal devices are respectively referred to as a first terminal device and a second terminal device. Vehicles are used as examples of both the two terminal devices. Both the two terminal devices are connected to one network device, and the two terminal devices may further communicate with each other. For example, the two terminal devices may communicate with each other through a PSSCH. Certainly, a quantity of terminal devices in FIG. 2 is merely an example. In actual application, the network device may provide services for a plurality of terminal devices, and the plurality of terminal devices may also communicate with each other.

The network device in FIG. 2 is, for example, an access network device such as a base station. The access network device corresponds to different devices in different systems. For example, the access network device may correspond to an eNB in a 4th generation (4G) mobile communications technology system, and correspond to an access network device in a 5G system, for example, a gNB.

The following describes the technical solutions provided in the embodiments of this application with reference to the accompanying drawings.

Figure 3:
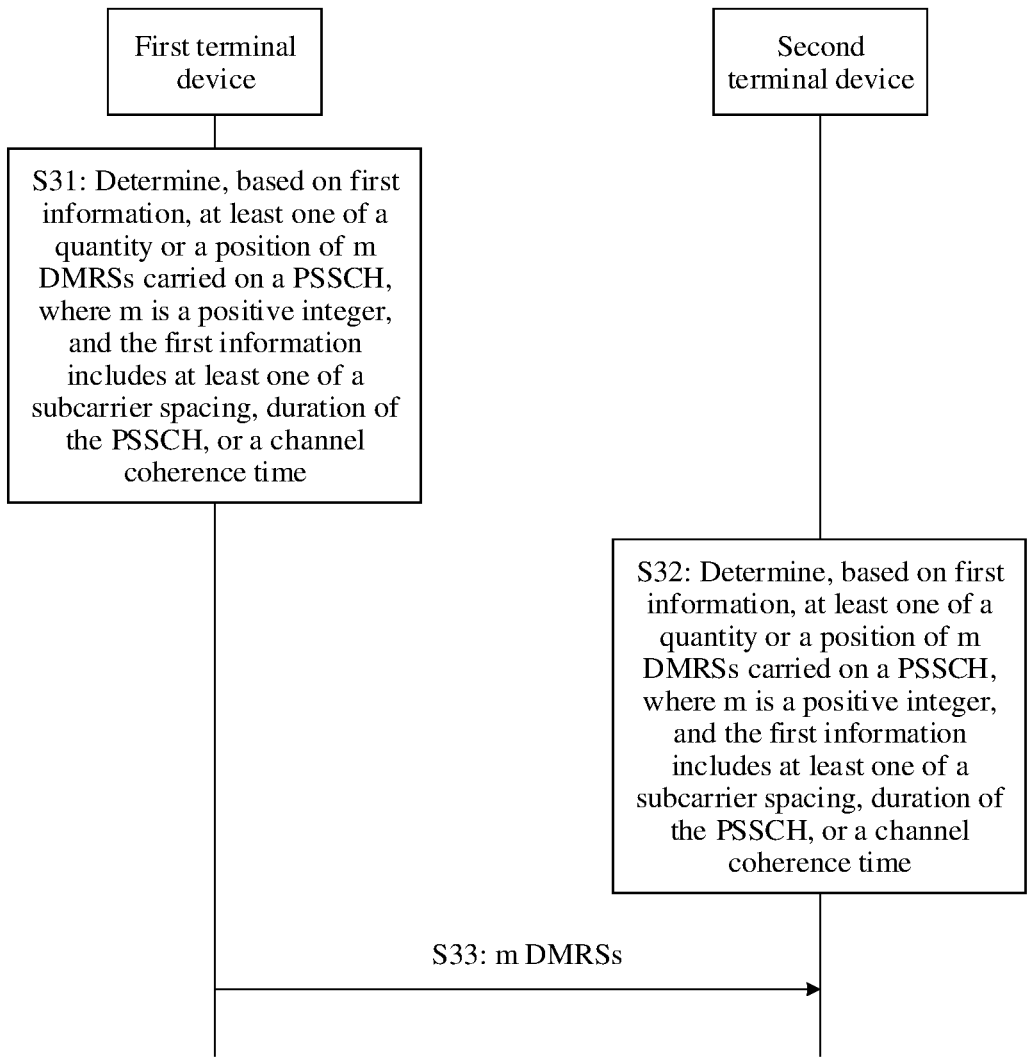
FIG. 3 is a flowchart of an information sending and receiving method according to an embodiment of this application.

An embodiment of this application provides an information sending and receiving method. FIG. 3 is a flowchart of the method. In the following description process, an example in which the method is used for the network architecture shown in FIG. 2 is used. In addition, the method may be performed by two communications apparatuses. The two communications apparatuses are, for example, a first communications apparatus and a second communications apparatus. The first communications apparatus may be a network device or a communications apparatus that can support a network device in implementing a function required in the method, or the first communications apparatus may be a terminal device or a communications apparatus (for example, a chip system) that can support a terminal device in implementing a function required in the method. Similarly, the second communications apparatus may be a network device or a communications apparatus that can support a network device in implementing a function required in the method, or the second communications apparatus may be a terminal device or a communications apparatus (for example, a chip system) that can support a terminal device in implementing a function required in the method. In addition, implementations of the first communications apparatus and the second communications apparatus are not limited. For example, both the first communications apparatus and the second communications apparatus are terminal devices, or the first communications apparatus is a terminal device and the second communications apparatus is a communications apparatus that can support a terminal device in implementing a function required in the method.

For ease of description, the following uses an example in which the method is performed by two terminal devices, to be specific, an example in which the first communications apparatus is a terminal device and the second communications apparatus is also a terminal device. For ease of differentiation, the two terminal devices are respectively referred to as a first terminal device and a second terminal device. Because an example in which the method is used for the network architecture shown in FIG. 2 is used below, the first terminal device described below may be the first terminal device in the network architecture shown in FIG. 2, and the second terminal device described below may be the second terminal device in the network architecture shown in FIG. 2.

S31: The first terminal device determines, based on first information, at least one of a quantity or a position of m DMRSs carried on a PSSCH, where m is a positive integer, and the first information includes at least one of a subcarrier spacing, duration of the PSSCH, or a channel coherence time.

For example, that a first terminal device determines, based on first information, at least one of a quantity or a position of m DMRSs carried on a PSSCH includes that the first terminal device determines, based on the first information, the quantity or the position of the m DMRSs carried on the PSSCH, or the first terminal device determines, based on the first information, the quantity and the position of the m DMRSs carried on the PSSCH.

Because an NR system supports different subcarrier spacings, and OFDM symbols corresponding to different subcarrier spacings have different lengths, in this embodiment of this application, the first information may include the subcarrier spacing. In addition, the duration of the PSSCH is generally related to the determining of the quantity of the DMRSs. Therefore, the first information may also include the duration of the PSSCH. The duration of the PSSCH may also be referred to as a time length of the PSSCH, or may be referred to as duration, in time domain, of the PSSCH, or may be referred to as a quantity of symbols (such as OFDM symbols, and for brevity, a time domain symbol such as the OFDM symbol is referred to as a symbol below) occupied by the PSSCH, or referred to as a quantity of symbols in the PSSCH, or the like. This is not specifically limited. In addition, to accurately estimate a time-varying channel, a distribution interval of the DMRS in time domain should be less than or equal to the channel coherence time. Therefore, the first information may further include the channel coherence time. However, in this embodiment of this application, content specifically included in the first information is not limited. For example, the first information includes the at least one of the subcarrier spacing, the duration of the PSSCH, or the channel coherence time. This may be understood as follows: For example, the first information includes the subcarrier spacing, the duration of the PSSCH, and the channel coherence time, or the first information includes the subcarrier spacing and the channel coherence time, or the first information includes the subcarrier spacing and the duration of the PSSCH, or the first information includes the duration of the PSSCH and the channel coherence time, or the first information includes the subcarrier spacing, the duration of the PSSCH, or the channel coherence time. In addition, in addition to the at least one of the subcarrier spacing, the duration of the PSSCH, or the channel coherence time, the first information may further include other information, provided that the information can be used to determine the quantity and/or the position of the DMRSs. Specific content included in the first information is not limited.

The first terminal device may determine, in different manners based on the first information, the at least one of the quantity or the position of the m DMRSs carried on the PSSCH.

In a first manner in which the first terminal device determines, based on the first information, the at least one of the quantity or the position of the m DMRSs carried on the PSSCH, the first terminal device may determine duration of a symbol based on the subcarrier spacing. To relatively accurately estimate the time-varying channel, in this embodiment of this application, a distribution interval of the DMRS in time domain may be less than or equal to the channel coherence time. Therefore, the first terminal device may determine a time interval between two adjacent DMRSs in the m DMRSs based on duration of a time domain symbol and the channel coherence time, where the time interval between the two adjacent DMRSs in the m DMRSs is less than or equal to the channel coherence time. The first terminal device further determines at least one of the quantity or the position of the m DMRSs based on the duration of the PSSCH and the time interval between the two adjacent DMRSs in the m DMRSs. For example, the first terminal device may determine a value of m and the position of the m DMRSs on the PSSCH based on the duration of the PSSCH and the time interval between the two adjacent DMRSs in the m DMRSs.

In the first manner, the first terminal device directly calculates the at least one of the quantity or the position of the m DMRSs based on the first information. In this case, to simplify implementation of the first terminal device, this embodiment of this application further provides a manner, to be specific, a second manner in which the first terminal device determines, based on the first information, the at least one of the quantity or the position of the m DMRSs carried on the PSSCH. In the second manner, the first terminal device may determine the at least one of the quantity or the position of the m DMRSs based on the first information and a preconfigured correspondence between a DMRS and at least one of the subcarrier spacing, the duration of the PSSCH, or the channel coherence time. In other words, the correspondence between a DMRS and at least one of the subcarrier spacing, the duration of the PSSCH, or the channel coherence time is preconfigured, so that the first terminal device only needs to know the first information, and then may directly determine the at least one of the quantity or the position of the m DMRSs based on the first information and the correspondence. The correspondence between a DMRS and at least one of the subcarrier spacing, the duration of the PSSCH, or the channel coherence time may be understood as a correspondence between at least one of the quantity or the position of the DMRSs and at least one of the subcarrier spacing, the duration of the PSSCH, or the channel coherence time.

For example, if a correspondence between the quantity and the position of the DMRSs, and the subcarrier spacing, the duration of the PSSCH, and the channel coherence time is preconfigured, the first terminal device may determine the quantity and the position of the m DMRSs based on the correspondence, and the subcarrier spacing, the duration of the PSSCH, and the channel coherence time, or the first terminal device may determine the quantity and the position of the m DMRSs based on the correspondence, and the subcarrier spacing and the duration of the PSSCH. Alternatively, if a correspondence between the subcarrier spacing and the duration of the PSSCH, and the quantity and the position of the DMRSs is preconfigured, the first terminal device may determine the quantity and the position of the m DMRSs based on the correspondence, and the subcarrier spacing and the duration of the PSSCH. In the second manner, an operation process of the first terminal device can be effectively simplified, and efficiency of determining the at least one of the quantity or the position of the m DMRSs can be improved. For example, the correspondence is specified by using a protocol, or is preconfigured by the network device for a terminal device, or is configured by a terminal device and then notified to another terminal device. In this case, the terminal device that configures the correspondence may be the first terminal device, or may be another terminal device. Table 2 shows an example of a correspondence.

TABLE 2

| SCS | Quantity N of symbols in the PSSCH (duration in symbols) | DMRS positions | | | | |
|---|---|---|---|---|---|---|
| | | 0 | 1 | 2 | 3 | 4 |
| 60 kHz | 1 to 8 | 0 | | | | |
| | 9 to 14 | 0 | 8 | | | |
| 30 kHz | 1 to 5 | 0 | | | | |
| | 6 to 10 | 0 | 5 | | | |
| | 11 to 14 | 0 | 5 | 10 | | |
| 15 kHz | 1 to 3 | 0 | | | | |
| | 4 to 6 | 0 | 3 | | | |
| | 7 to 9 | 0 | 3 | 6 | | |
| | 10 to 12 | 0 | 3 | 6 | 9 | |
| | 13 and 14 | 0 | 3 | 6 | 9 | 12 |

Table 2 may be understood as the correspondence between the subcarrier spacing and the duration of the PSSCH, and the quantity and the position of the DMRSs. However, during setting of the correspondence, because the position of the DMRSs needs to be determined, the channel coherence time is also used. Therefore, Table 2 may also be understood as the correspondence between the quantity and the position of the DMRSs, and the subcarrier spacing and the duration of the PSSCH, and the channel coherence time. In Table 2, in the column of the DMRS position, 0 to 5 in the horizontal coordinate of the first row may be considered as pointers instead of positions or quantities of DMRSs. Numbers in the following rows, such as 3, 6, and 9, may be considered as positions of symbols occupied by the DMRSs. For example, 3 indicates that a symbol whose sequence number is 3 is occupied. For example, the subcarrier spacing is 15 kHz. If the duration of the PSSCH is three symbols, the DMRS position includes only one DMRS that occupies a symbol whose sequence number is 0, and then the DMRS may cover the entire PSSCH. In other words, the quantity of the m DMRSs is 1, that is, m=1. Alternatively, the subcarrier spacing is 15 kHz. If the duration of the PSSCH is six symbols, it is insufficient that the DMRS position includes only one DMRS that occupies a symbol whose sequence number is 0, because a time interval between the symbol in which the DMRS is located and the last symbol in the PSSCH is greater than the channel coherence time. Therefore, one DMRS that occupies a symbol whose sequence number is 3 is further included. In other words, the quantity of the m DMRSs is 2, that is, m=2. The sequence numbers of the symbols herein are written by using an example in which sequence numbers of symbols occupied by the PSSCH start from 0 in a time domain sequence.

Figure 4:
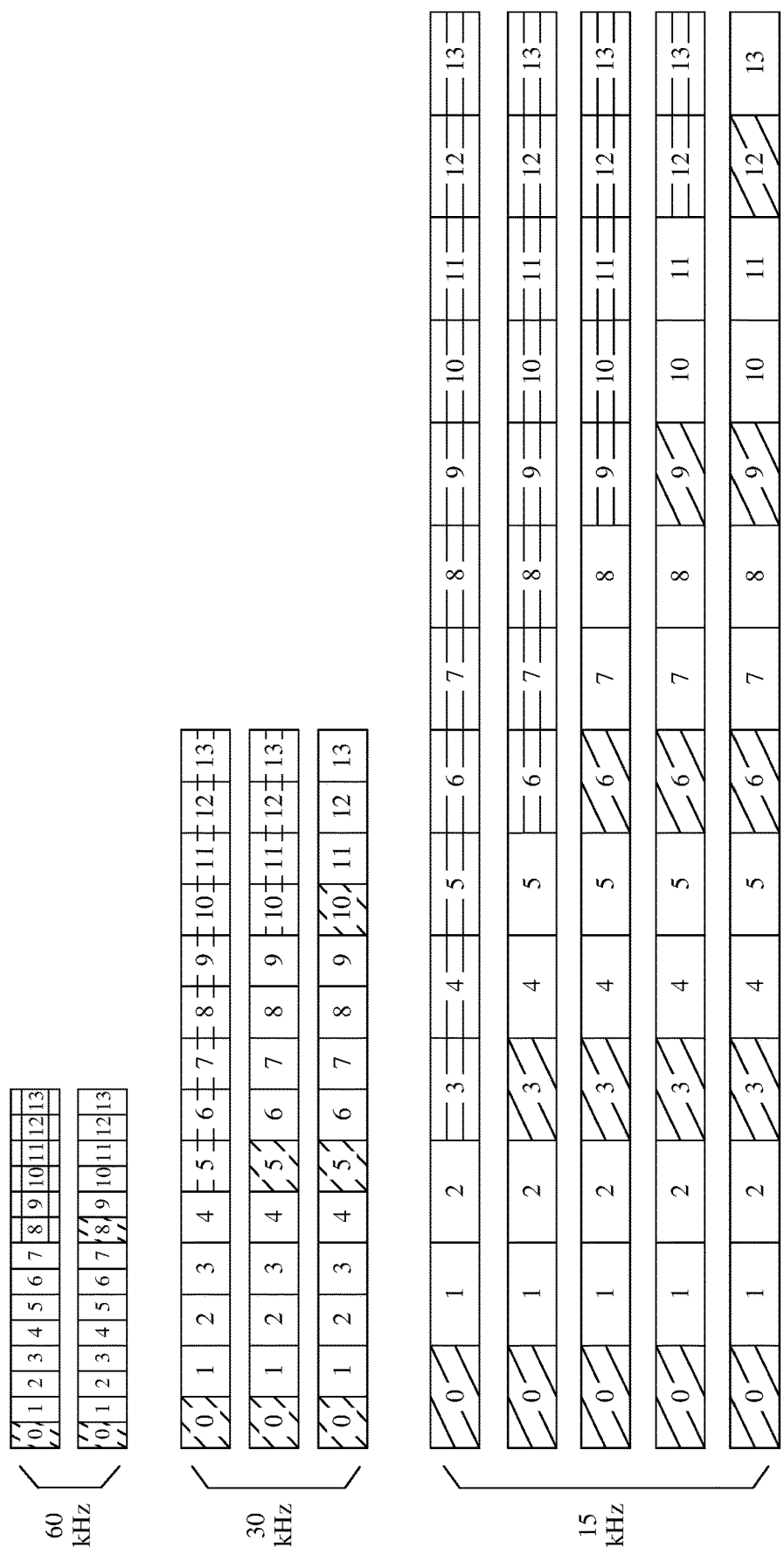
FIG. 4 is a schematic diagram of a front-loaded DMRS configuration solution according to an embodiment of this application.

To better understand Table 2, refer to FIG. 4. FIG. 4 is a schematic diagram of several cases of the correspondence shown in Table 2. In FIG. 4, a box drawn with diagonal lines represents a symbol occupied by a DMRS, a box drawn with horizontal lines represents a symbol that is not occupied by a PSSCH, and a symbol represented by a blank box and a symbol occupied by a DMRS are symbols occupied by the PSSCH. The 15 kHz subcarrier spacing is used as an example. In this case, duration of one symbol is 71.4 μs (when a standard cyclic prefix (CP) is used). If the channel coherence time is 0.152 ms, the time interval between the adjacent DMRSs in the m DMRSs should not be greater than two symbols, to ensure a channel coherence time in which a time-domain interval is less than 0.152 ms, and the quantity of the DMRSs needs to be reduced as much as possible. Therefore, it can be learned that in FIG. 4, when the subcarrier spacing is 15 kHz, the time interval between the two adjacent DMRSs is two symbols, is not greater than two symbols, and is less than the channel coherence time, and the time interval between the two adjacent DMRSs is not set to one symbol, so that distribution of the DMRSs is not excessively dense as far as possible, thereby improving transmission efficiency of the PSSCH. However, as a length of a slot in which the PSSCH is located continuously increases, the quantity of the DMRSs needs to be correspondingly increased. For example, the subcarrier spacing is 15 kHz. If the duration of the PSSCH is nine symbols, the quantity of the DMRSs is 3, and the three DMRSs respectively occupy a symbol whose sequence number is 0, a symbol whose sequence number is 3, and a symbol whose sequence number is 6, namely, the first symbol in the PSSCH, a $4^{th}$ symbol in the PSSCH, and a $7^{th}$ symbol in the PSSCH. Alternatively, the subcarrier spacing is 60 kHz. If the duration of the PSSCH is eight symbols, the quantity of the DMRSs is 1, and the one DMRS occupies a symbol whose sequence number is 0, namely, the first symbol in the PSSCH. If the duration of the PSSCH is 14 symbols, the quantity of the DMRSs is 2, and the two DMRSs respectively occupy a symbol whose sequence number is 0 and a symbol whose sequence number is 8, namely, the first symbol in the PSSCH and a $9^{th}$ symbol in the PSSCH. The rest can be deduced by analogy. Details are not described again.

Certainly, if the first terminal device does not use the second manner when determining, based on the first information, the at least one of the quantity or the position of the m DMRSs carried on the PSSCH, but uses the first manner described above, a determining result may also be the same as the result in Table 2 or FIG. 4.

Determining the position of the m DMRSs on the PSSCH is further related to another factor, to be specific, determining a position of the first DMRS in time domain in the m DMRSs. After the position of the first DMRS is determined, positions of subsequent DMRSs may be successively determined.

In this embodiment of this application, to accelerate a decoding process and reduce a latency, a front-loaded DMRS configuration solution may be used. In other words, the first DMRS in time domain in the m DMRSs may be placed in the forefront of the PSSCH as much as possible. This helps accelerate the decoding process and reduce the transmission latency. However, according to a requirement, in the NR system, the first symbol in the PSSCH may be configured to be occupied by data or automatic gain control (AGC). In the two cases, the front-loaded DMRS configuration solution is slightly different. The following separately describes the two cases.

1. The first symbol in the PSSCH is occupied by data.

That the first symbol in the PSSCH is occupied by data may also be understood as that the first symbol in the PSSCH is not occupied by AGC. In this case, because a front-loaded DMRS configuration is used in this embodiment of this application, the first DMRS in time domain in the m DMRSs may occupy the first symbol in the PSSCH. This is used as an example in Table 2 and FIG. 4.

2. The first symbol in the PSSCH is occupied by AGC.

Because the first symbol in the PSSCH is occupied by AGC, it is clear that a DMRS cannot occupy the first symbol in the PSSCH. Therefore, the DMRS may be correspondingly moved backward. For example, the first DMRS in time domain in the m DMRSs may occupy the second symbol in the PSSCH. Certainly, if the second symbol in the PSSCH is also occupied by another signal other than a DMRS, the DMRS may be further moved backward. Herein, an example in which the first DMRS in time domain in the m DMRSs occupies the second symbol in the PSSCH is used.

If the first terminal device determines, based on the first information in the first manner described above, the at least one of the quantity or the position of the m DMRSs carried on the PSSCH, the first terminal device may determine, depending on whether the first symbol in the PSSCH is occupied by AGC, the position of the first DMRS in time domain in the m DMRSs, and may also directly determine the at least one of the quantity or the position of the m DMRSs based on the first information. If the first terminal device determines, based on the first information in the second manner described above, the at least one of the quantity or the position of the m DMRSs carried on the PSSCH, when the first DMRS in time domain in the m DMRSs occupies the second symbol in the PSSCH, for an example of a correspondence, refer to Table 3.

TABLE 3

| SCS | Duration in symbols N | DMRS positions | | | | |
|---|---|---|---|---|---|---|
| | | 0 | 1 | 2 | 3 | 4 |
| 60 kHz | 1 to 8 | 1 | | | | |
| | 9 to 14 | 1 | 9 | | | |
| 30 kHz | 1 to 5 | 1 | | | | |
| | 6 to 10 | 1 | 6 | | | |
| | 11 to 14 | 1 | 6 | 11 | | |
| 15 kHz | 1 to 3 | 1 | | | | |
| | 4 to 6 | 1 | 4 | | | |
| | 7 to 9 | 1 | 4 | 7 | | |
| | 10 to 12 | 1 | 4 | 7 | 10 | |
| | 13 and 14 | 1 | 4 | 7 | 10 | 13 |

Table 3 may be understood as the correspondence between the subcarrier spacing and the duration of the PSSCH, and the quantity and the position of the DMRSs. However, during setting of the correspondence, because the position of the DMRSs needs to be determined, the channel coherence time is also used. Therefore, Table 3 may also be understood as the correspondence between the quantity and the position of the DMRSs, and the subcarrier spacing and the duration of the PSSCH, and the channel coherence time. In Table 3, in the column of the DMRS position, 0 to 5 in the horizontal coordinate of the first row may be considered as pointers instead of positions or quantities of DMRSs. Numbers in the following rows, such as 3, 6, and 9, may be considered as positions of symbols occupied by the DMRSs. For example, 3 indicates that a symbol whose sequence number is 3 is occupied. For example, the subcarrier spacing is 15 kHz. If the duration of the PSSCH is four symbols, the DMRS position includes only one DMRS that occupies a symbol whose sequence number is 1, and then the DMRS may cover the entire PSSCH. In other words, the quantity of the m DMRSs is 1, that is, m=1. Alternatively, the subcarrier spacing is 15 kHz. If the duration of the PSSCH is seven symbols, it is insufficient that the DMRS position includes only one DMRS that occupies a symbol whose sequence number is 1, because a time interval between the symbol in which the DMRS is located and the last symbol in the PSSCH is greater than the channel coherence time. Therefore, one DMRS that occupies a symbol whose sequence number is 4 is further included. In other words, the quantity of the m DMRSs is 2, that is, m=2. The sequence numbers of the symbols herein are written by using an example in which sequence numbers of symbols occupied by the PSSCH start from 0 in a time domain sequence.

Figure 5:
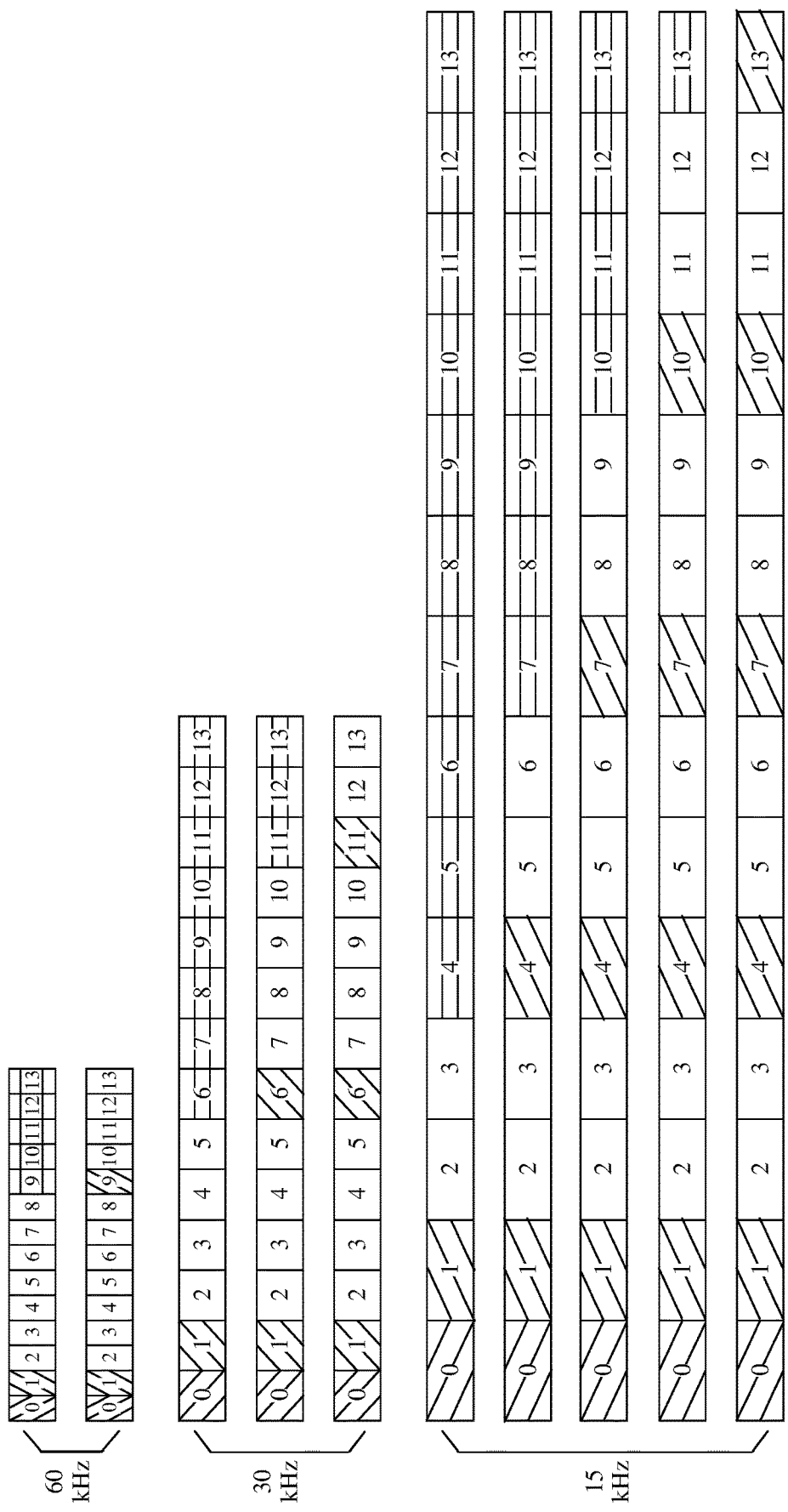
FIG. 5 is another schematic diagram of a front-loaded DMRS configuration solution according to an embodiment of this application.

To better understand Table 3, refer to FIG. 5. FIG. 5 is a schematic diagram of several cases of the correspondence shown in Table 3. In FIG. 5, a box drawn with "/" represents a symbol occupied by a DMRS, a box drawn with "\" represents a symbol occupied by AGC, a box drawn with horizontal lines represents a symbol that is not occupied by a PSSCH, and a symbol represented by a blank box and a symbol occupied by a DMRS are symbols occupied by the PSSCH. The 15 kHz subcarrier spacing is used as an example. In this case, duration of one symbol is 71.4 μs (when a standard cyclic prefix (CP) is used). If the channel coherence time is 0.152 ms, the time interval between the adjacent DMRSs in the m DMRSs should not be greater than two symbols, to ensure a channel coherence time in which a time-domain interval is less than 0.152 ms, and the quantity of the DMRSs needs to be reduced as much as possible. Therefore, it can be learned that in FIG. 5, when the subcarrier spacing is 15 kHz, the time interval between the two adjacent DMRSs is two symbols, is not greater than two symbols, and is less than the channel coherence time, and the time interval between the two adjacent DMRSs is not set to one symbol, so that distribution of the DMRSs is not excessively dense as far as possible, thereby improving transmission efficiency of the PSSCH. However, as a length of a slot in which the PSSCH is located continuously increases, the quantity of the DMRSs needs to be correspondingly increased. For example, the subcarrier spacing is 15 kHz. If the duration of the PSSCH is 10 symbols, the quantity of the DMRSs is 3, and the three DMRSs respectively occupy a symbol whose sequence number is 1, a symbol whose sequence number is 4, and a symbol whose sequence number is 7, namely, the second symbol in the PSSCH, a $5^{th}$ symbol in the PSSCH, and an $8^{th}$ symbol in the PSSCH. Alternatively, the subcarrier spacing is 60 kHz. If the duration of the PSSCH is nine symbols, the quantity of the DMRSs is 1, and the one DMRS occupies a symbol whose sequence number is 1, namely, the second symbol in the PSSCH. If the duration of the PSSCH is 14 symbols, the quantity of the DMRSs is 2, and the two DMRSs respectively occupy a symbol whose sequence number is 1 and a symbol whose sequence number is 9, namely, the second symbol in the PSSCH and a $10^{th}$ symbol in the PSSCH. The rest can be deduced by analogy. Details are not described again.

Certainly, if the first terminal device does not use the second manner when determining, based on the first information, the at least one of the quantity or the position of the m DMRSs carried on the PSSCH, but uses the first manner described above, a determining result may also be the same as the result in Table 3 or FIG. 5.

Figure 6:
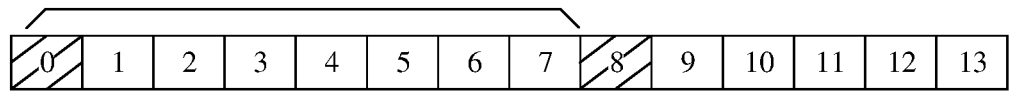
FIG. 6 is a schematic diagram of comparison between a front-loaded DMRS configuration solution and a non-front-loaded DMRS configuration solution according to an embodiment of this application.
Figure 6:
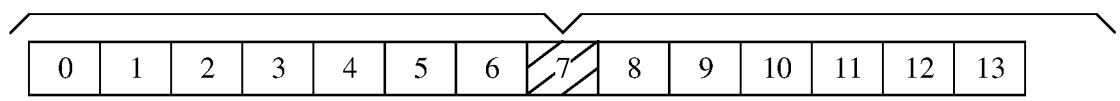

In this embodiment of this application, the PSSCH and a physical sidelink control channel (PSCCH) that is transmitted by the first terminal device may be in a time division multiplexing (TDM or TDMed) mode or a frequency division multiplexing (FDM or FDMed) mode. If the PSSCH and the PSCCH are in the TDM mode, using the front-loaded DMRS configuration solution described above can help accelerate the decoding process and reduce the transmission latency. However, if the PSSCH and the PSCCH are in the FDM mode, the decoding process may no longer be capable of being accelerated if the foregoing front-loaded DMRS configuration solution continues to be used. In addition, to cope with a high-speed scenario, the front-loaded DMRS configuration solution may require a relatively large quantity of DMRSs, and this increases DMRS overheads. In this case, an embodiment of this application provides another DMRS configuration solution, which may be referred to as a non-front-loaded DMRS configuration solution or a flexible DMRS configuration solution. It may be understood that the first DMRS, in time domain, carried on the PSSCH is not carried in the first symbol in the PSSCH. For example, referring to FIG. 6, the first row in FIG. 6 represents a front-loaded DMRS configuration solution, and the second row in FIG. 6 represents a non-front-loaded DMRS configuration solution provided in this embodiment of this application. It can be learned that, under a condition of a same channel coherence time, from a perspective of DMRS overheads, the front-loaded DMRS configuration solution requires more DMRSs. Therefore, considering that the front-loaded DMRS configuration solution may cause relatively large DMRS overheads, and if the PSSCH and the PSCCH are in the FDM mode, the decoding process may no longer be capable of being accelerated if the foregoing front-loaded DMRS configuration solution continues to be used, this embodiment of this application proposes the following solution: If the PSSCH and the PSCCH are in the FDM mode, the front-loaded DMRS configuration solution may not be used, but the flexible DMRS configuration solution provided in this embodiment of this application is used. That is, the foregoing front-loaded DMRS configuration solution may be used when the PSSCH and the PSCCH are in the TDM mode. The following describes a flexible DMRS configuration solution that can be used when the PSSCH and the PSCCH are in the FDM mode.

Before determining the at least one of the quantity or the position of the m DMRSs, the first terminal device may first determine whether a PSSCH and a PSCCH that is transmitted by the first terminal device are in the TDM mode or the FDM mode. If the PSSCH and the PSCCH are in the TDM mode, the first terminal device may determine to use the front-loaded DMRS configuration solution described above. In other words, if the first symbol in the PSSCH is occupied by AGC, the first terminal device determines that the first DMRS in time domain in the m DMRSs occupies the second symbol in the PSSCH; or if the first symbol in the PSSCH is not occupied by AGC, the first terminal device determines that the first DMRS in time domain in the m DMRSs occupies the first symbol in the PSSCH. Alternatively, if the PSSCH and the PSCCH that is transmitted by the first terminal device are in the FDM mode, the first terminal device may determine to use a flexible DMRS configuration solution described below to determine a position of the first DMRS in time domain in the m DMRSs. Alternatively, the first terminal device may not perform an operation of determining whether a PSSCH and a PSCCH that is transmitted by the first terminal device are in the TDM mode or the FDM mode. For example, whether a PSSCH and a PSCCH that is transmitted by the first terminal device are in the TDM mode or the FDM mode is predetermined, and the first terminal device already knows this. Therefore, the first terminal device does not need to perform the determining, and only needs to correspondingly use a front-loaded DMRS configuration solution or a flexible DMRS configuration solution.

In the flexible DMRS configuration solution, a manner in which the first terminal device determines the at least one of the quantity or the position of the m DMRSs based on the first information is the same as the foregoing manners, and the determining may be performed in the foregoing first manner or second manner. This may be understood as that in this solution, a difference from the foregoing front-loaded DMRS configuration solution is that, a position of a symbol occupied by the first DMRS in time domain in the m DMRSs is different. In this solution, the first DMRS in time domain in the m DMRSs occupies a symbol whose sequence number is n in the PSSCH, total duration of n symbols whose sequence numbers are 0 to n−1 in the PSSCH is less than or equal to the channel coherence time, and n is a positive integer. For example, if sequence numbers of symbols occupied by the PSSCH start from 0 in a time domain sequence, a symbol whose sequence number is n should be an $(n+1)^{th}$ symbol in the PSSCH. For example, if n=3 and sequence numbers of symbols occupied by the PSSCH starts from 0, a symbol whose sequence number is 3 in the PSSCH should be the $4^{th}$ symbol in the PSSCH. For example, a value of n is specified in a protocol, or is configured by a network device for a terminal device, or is configured by a terminal device and notified to another terminal device. If the value of n is configured by a terminal device, the terminal device that configures the value of n may be the first terminal device, or may be another terminal device.

If the first terminal device determines, based on the first information in the first manner described above, the at least one of the quantity or the position of the m DMRSs carried on the PSSCH, the first terminal device may determine the value of n, to be specific, determine the position of the first DMRS in time domain in the m DMRSs, or may directly determine the at least one of the quantity or the position of the m DMRSs based on the first information. If the first terminal device determines, based on the first information in the second manner described above, the at least one of the quantity or the position of the m DMRSs carried on the PSSCH, when the first DMRS in time domain in the m DMRSs occupies the symbol whose sequence number is n in the PSSCH, for an example of a correspondence, refer to Table 4.

TABLE 4

| SCS | Durations in symbols N | DMRS positions 0 | 1 | 2 | 3 |
|---|---|---|---|---|---|
| 60 kHz | 1 to 14 | $\lceil N/2 \rceil - 1$ | | | |
| 30 kHz | 1 to 9 | $\lceil N/2 \rceil - 1$ | | | |
| | 10 to 14 | $\lceil N/3 \rceil - 1$ | $N - \lceil N/3 \rceil$ | | |
| 15 kHz | 1 to 5 | $\lceil N/2 \rceil - 1$ | | | |
| | 6 to 8 | $\lceil N/3 \rceil - 1$ | $N - \lceil N/3 \rceil$ | | |
| | 9 to 11 | $\lceil N/4 \rceil - 1$ | $\lceil N/2 \rceil - 1$ | $N - \lceil N/4 \rceil$ | |
| | 12 to 14 | $\lceil N/5 \rceil - 1$ | $\lceil 2N/5 \rceil - 1$ | $\lceil 3N/5 \rceil - 1$ | $N - \lceil N/5 \rceil$ |

N in Table 4 indicates duration of the PSSCH in the second column in Table 4. Formulas in the column of DMRS positions are used to calculate the value of n. $\lceil X \rceil$ indicates that X is rounded up. For example, if the duration of the PSSCH is eight symbols, that is, N=8, a DMRS occupies a symbol whose sequence number is 3 in symbols occupied by the PSSCH.

Table 4 may be understood as the correspondence between the subcarrier spacing and the duration of the PSSCH, and the quantity and the position of the DMRSs. However, during setting of the correspondence, because the position of the DMRSs needs to be determined, the channel coherence time is also used. Therefore, Table 4 may also be understood as the correspondence between the quantity and the position of the DMRSs, and the subcarrier spacing and the duration of the PSSCH, and the channel coherence time. For a related description of Table 4, refer to the foregoing descriptions of Table 2 or Table 3. Details are not described again.

Figure 7:
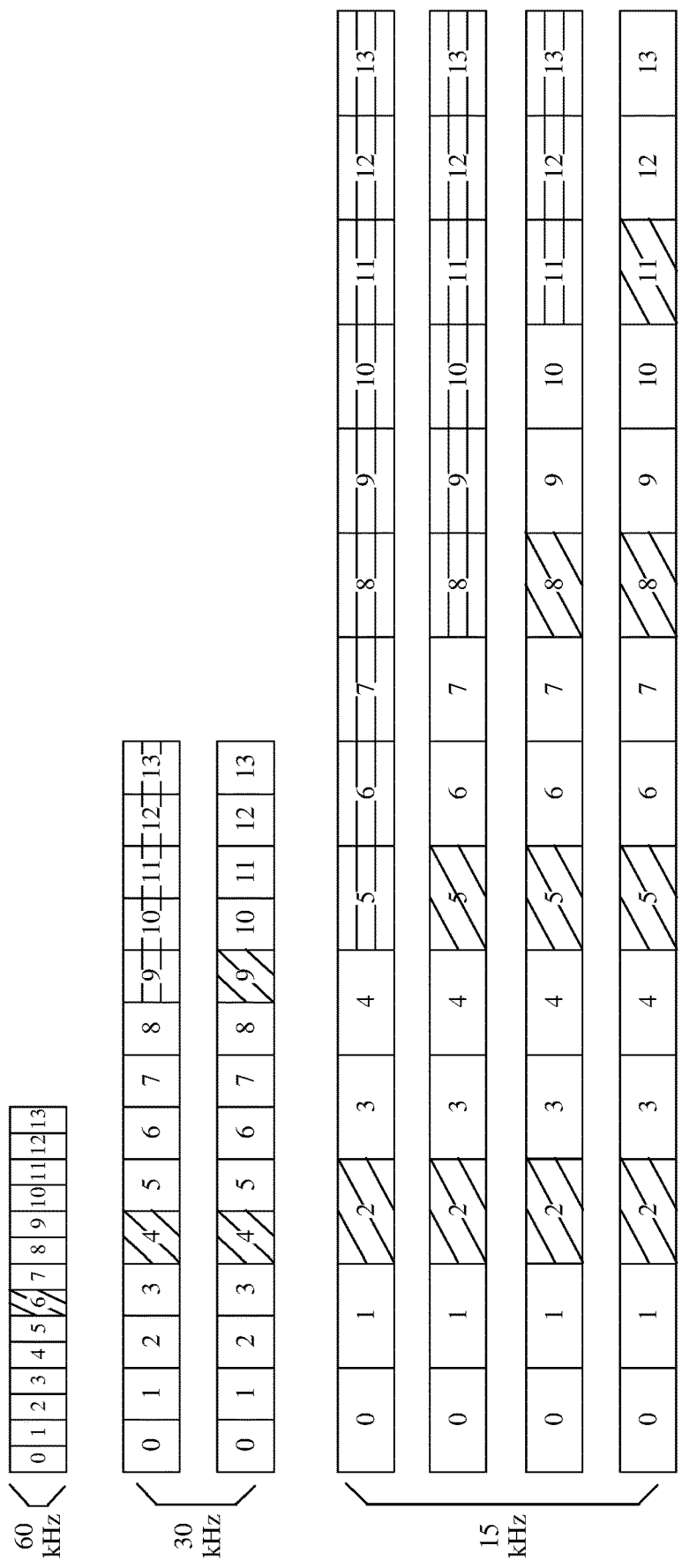
FIG. 7 is a schematic diagram of a flexible DMRS configuration solution according to an embodiment of this application.

To better understand Table 4, refer to FIG. 7. FIG. 7 is a schematic diagram of several cases of the correspondence shown in Table 5. In FIG. 7, a box drawn with diagonal lines represents a symbol occupied by a DMRS, a box drawn with horizontal lines represents a symbol that is not occupied by a PSSCH, and a symbol represented by a blank box and a symbol occupied by a DMRS are symbols occupied by the PSSCH. The 15 kHz subcarrier spacing is used as an example. In this case, duration of one symbol is 71.4 μs (when a standard cyclic prefix (CP) is used). If the channel coherence time is 0.152 ms, the time interval between the adjacent DMRSs in the m DMRSs should not be greater than two symbols, to ensure a channel coherence time in which a time-domain interval is less than 0.152 ms, and the quantity of the DMRSs needs to be reduced as much as possible. Therefore, it can be learned that in FIG. 7, when the subcarrier spacing is 15 kHz, the time interval between the two adjacent DMRSs is two symbols, is not greater than two symbols, and is less than the channel coherence time, and the time interval between the two adjacent DMRSs is not set to one symbol, so that distribution of the DMRSs is not excessively dense as far as possible, thereby improving transmission efficiency of the PSSCH. In addition, a flexible DMRS configuration solution is used in FIG. 7. Therefore, the first DMRS in time domain in the m DMRSs does not occupy the first time-domain symbol in the PSSCH. In this case, the channel coherence time also needs to be considered, so that the first DMRS in time domain in the m DMRSs can cover the first time-domain symbol in the PSSCH. Therefore, the total duration of the n symbols whose sequence numbers are 0 to n−1 in the PSSCH may be less than or equal to the channel coherence time. An example in which the subcarrier spacing is 15 kHz is still used. In FIG. 7, the first DMRS in the m DMRSs occupies a symbol whose sequence number is 2 in the PSSCH, namely, a $3^{rd}$ symbol in the PSSCH. Total duration of the first symbol and the second symbol (namely, the symbol whose sequence number is 0 and the symbol whose sequence number is 1) in the PSSCH is two symbols, and is less than or equal to the channel coherence time. However, as a length of a slot in which the PSSCH is located continuously increases, the quantity of the DMRSs needs to be correspondingly increased. For example, the subcarrier spacing is 15 kHz. If the duration of the PSSCH is 11 symbols, the quantity of the DMRSs is 3, and the three DMRSs respectively occupy a symbol whose sequence number is 2, a symbol whose sequence number is 5, and a symbol whose sequence number is 8, namely, the $3^{rd}$ symbol in the PSSCH, a $6^{th}$ symbol in the PSSCH, and the $9^{th}$ symbol in the PSSCH. Alternatively, the subcarrier spacing is 60 kHz. If the duration of the PSSCH is less than or equal to 14 symbols, the quantity of the DMRSs is 1, and the one DMRS occupies a symbol whose sequence number is 6, namely, the $7^{th}$ symbol in the PSSCH.

Certainly, if the first terminal device does not use the second manner when determining, based on the first information, the at least one of the quantity or the position of the m DMRSs carried on the PSSCH, but uses the first manner described above, a determining result may also be the same as the result in Table 4 or FIG. 7.

For example, FIG. 7 may be compared with FIG. 4 or FIG. 5. An example in which the subcarrier spacing is 15 kHz is used. Because the flexible DMRS configuration solution is used, when the duration of the PSSCH is {4, 5, 7, 8, 10, 11, 13, 14}, compared with the front-loaded DMRS solution, this solution can reduce overheads of one DMRS, and this helps improve transmission efficiency of the PSSCH.

S32: The second terminal device determines, based on first information, at least one of a quantity or a position of m DMRSs carried on a PSSCH, where m is a positive integer, and the first information includes at least one of a subcarrier spacing, duration of the PSSCH, or a channel coherence time.

To receive the PSSCH, the second terminal device may first determine, based on the first information, the at least one of the quantity or the position of the m DMRSs carried on the PSSCH.

Before determining the at least one of the quantity or the position of the m DMRSs, the second terminal device may first determine whether a PSSCH and a PSCCH that is transmitted by the second terminal device are in the TDM mode or the FDM mode. If the PSCCH and the PSSCH are in the TDM mode, the second terminal device may determine to use the front-loaded DMRS configuration solution described above. In other words, if the first symbol in the PSSCH is occupied by AGC, the second terminal device determines that the first DMRS in time domain in the m DMRSs occupies the second symbol in the PSSCH, where if sequence numbers of symbols occupied by the PSSCH start from 0 in a time domain sequence, the second symbol in the PSSCH is a symbol whose sequence number is 1; or if the first symbol in the PSSCH is not occupied by AGC, the second terminal device determines that the first DMRS in time domain in the m DMRSs occupies the first symbol in the PSSCH. Alternatively, if the PSSCH and the PSCCH that is transmitted by the second terminal device are in the FDM mode, the second terminal device may determine to use a flexible DMRS configuration solution described below to determine a position of the first DMRS in time domain in the m DMRSs. Alternatively, the second terminal device may not perform an operation of determining whether a PSSCH and a PSCCH that is transmitted by the second terminal device are in the TDM mode or the FDM mode. For example, whether a PSSCH and a PSCCH that is transmitted by the second terminal device are in the TDM mode or the FDM mode is predetermined, and the second terminal device already knows this. Therefore, the second terminal device does not need to perform the determining, and only needs to correspondingly use a front-loaded DMRS configuration solution or a flexible DMRS configuration solution. The PSSCH transmitted by the first terminal device and the PSSCH transmitted by the second terminal device may be a same PSSCH in this embodiment of this application.

The second terminal device may determine, based on the first information in a same manner as the first terminal device, the at least one of the quantity or the position of the m DMRSs carried on the PSSCH. For details, refer to the description in S31. Details are not described again.

S32 and S31 may be simultaneously performed, or S31 is performed before S32, or S31 is performed after S32. This is not specifically limited.

S33: The first terminal device sends the m DMRSs to the second terminal device, and the second terminal device receives the m DMRSs from the first terminal device.

After determining the at least one of the quantity or the position of the m DMRSs on the PSSCH, the first terminal device may send the m DMRSs to the second terminal device, so that the second terminal device may receive the m DMRSs. The second terminal device may perform an operation such as channel estimation by using the m DMRSs.

In the embodiments of this application, at least one of a quantity or a position of m DMRSs on a PSSCH may be determined based on at least one of a subcarrier spacing, duration of the PSSCH, or a channel coherence time, to provide a solution of configuring a DMRS on a PSSCH in V2X in the NR system. When the DMRS on the PSSCH is determined, a reference channel coherence time may be selected. For example, a time interval between two configured adjacent DMRSs may be less than or equal to the channel coherence time, so that accuracy of performing channel estimation based on a DMRS can be improved. In addition, in this embodiment of this application, a DMRS configuration solution is separately provided for the TDM mode and the FDM mode, so that DMRS overheads can be reduced as much as possible in the FDM mode, and this improves link transmission efficiency of the PSSCH.

The following describes, with reference to the accompanying drawings, apparatuses configured to implement the foregoing methods in the embodiments of this application. Therefore, all the foregoing content may be used in subsequent embodiments, and repeated content is not described again.

Figure 8:
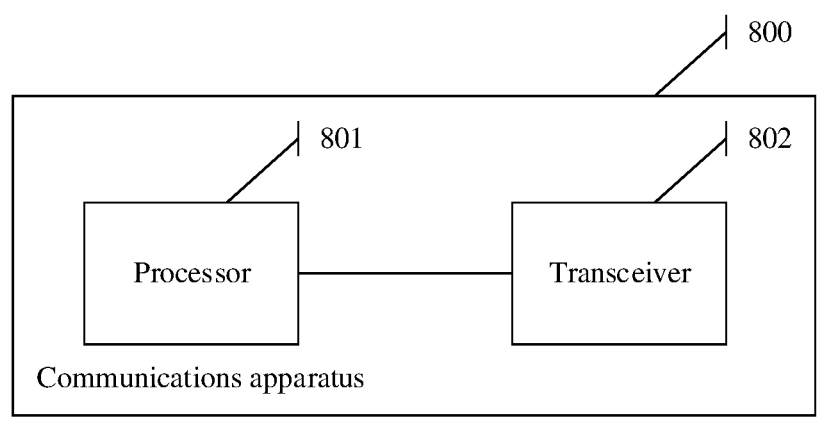
FIG. 8 is a schematic diagram of a communications apparatus that can implement a function of a network device according to an embodiment of this application.

FIG. 8 is a schematic structural diagram of a communications apparatus 800. The communications apparatus 800 may implement a function of the first terminal device described above. The communications apparatus 800 may be the first terminal device described above, or may be a chip disposed in the first terminal device described above. The communications apparatus 800 may include a processor 801 and a transceiver 802. The processor 801 may be configured to perform S31 in the embodiment shown in FIG. 3 and/or another process used to support the technology described in this specification. For example, the processor 801 may perform all or some of the processes performed by the first terminal device other than the receiving and sending processes described above. The transceiver 802 may be configured to perform S33 in the embodiment shown in FIG. 3 and/or another process used to support the technology described in this specification, for example, may perform all or some of the foregoing receiving and sending processes performed by the first terminal device.

For example, the processor 801 is configured to determine, based on first information, at least one of a quantity or a position of m DMRSs carried on a PSSCH, where m is a positive integer, and the first information includes at least one of a subcarrier spacing, duration of the PSSCH, or a channel coherence time.

The transceiver 802 is configured to send the m DMRSs to a second terminal device.

All related content of steps in the foregoing method embodiments may be cited in function descriptions of corresponding function modules, and details are not described herein again.

Figure 9:
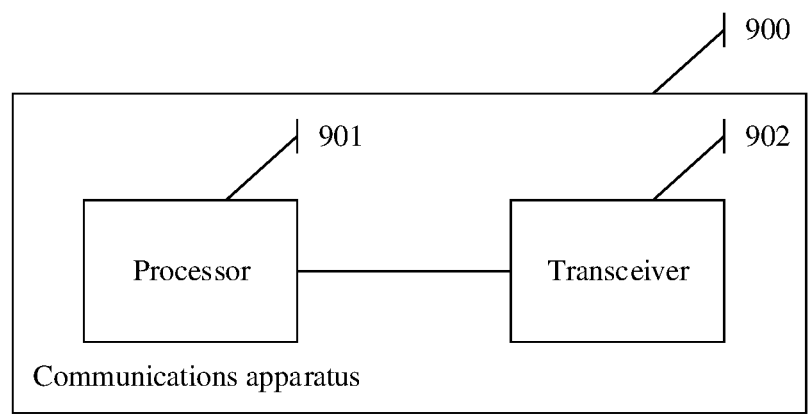
FIG. 9 is a schematic diagram of a communications apparatus that can implement a function of a terminal device according to an embodiment of this application.

FIG. 9 is a schematic structural diagram of a communications apparatus 900. The communications apparatus 900 may implement a function of the second terminal device described above. The communications apparatus 900 may be the second terminal device described above, or may be a chip disposed in the second terminal device described above. The communications apparatus 900 may include a processor 901 and a transceiver 902. The processor 901 may be configured to perform S32 in the embodiment shown in FIG. 3 and/or another process used to support the technology described in this specification. For example, the processor 901 may perform all or some of the processes performed by the second terminal device other than the receiving and sending processes described above. The transceiver 902 may be configured to perform S33 in the embodiment shown in FIG. 3 and/or another process used to support the technology described in this specification, for example, may perform all or some of the foregoing receiving and sending processes performed by the second terminal device.

For example, the processor 901 is configured to determine, based on first information, at least one of a quantity or a position of m DMRSs carried on a PSSCH, where m is a positive integer, and the first information includes at least one of a subcarrier spacing, duration of the PSSCH, or a channel coherence time.

The transceiver 902 is configured to receive the m DMRSs from a first terminal device.

All related content of steps in the foregoing method embodiments may be cited in function descriptions of corresponding function modules, and details are not described herein again.

Figure 10A:
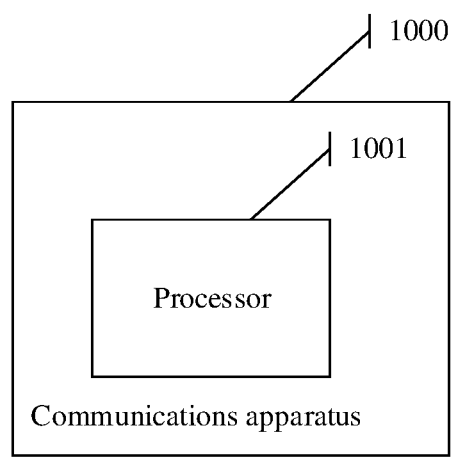
FIG. 10A and FIG. 10B are two schematic diagrams of a communications apparatus according to an embodiment of this application.

In a simple embodiment, a person skilled in the art may figure out that the communications apparatus 800 or the communications apparatus 900 may be further implemented by using a structure of the communications apparatus 1000 shown in FIG. 10A. The communications apparatus 1000 may implement a function of the terminal device or the network device described above. The communications apparatus 1000 may include a processor 1001.

When the communications apparatus 1000 is configured to implement a function of the first terminal device described above, the processor 1001 may be configured to perform S31 in the embodiment shown in FIG. 3 and/or another process used to support the technology described in this specification, for example, may perform all or some of the processes performed by the first terminal device other than the receiving and sending processes described above. Alternatively, when the communications apparatus 1000 is configured to implement a function of the second terminal device described above, the processor 1001 may be configured to perform S32 in the embodiment shown in FIG. 3 and/or another process used to support the technology described in this specification, for example, may perform all or some of the processes performed by the second terminal device other than the receiving and sending processes described above.

The communications apparatus 1000 may be a field-programmable gate array (FPGA), a dedicated integrated chip (ASIC), a system on chip (SoC), a central processing unit (CPU), a network processor (NP), a digital signal processing circuit (DSP), a micro controller unit (MCU), a programmable logic device (PLD), or another integrated chip. In this case, the communications apparatus 1000 may be disposed in the first terminal device or the second terminal device in the embodiments of this application, so that the first terminal device or the second terminal device implements the methods provided in the embodiments of this application.

In an optional implementation, the communications apparatus 1000 may include a transceiver component, configured to communicate with another device. When the communications apparatus 1000 is configured to implement a function of the first terminal device or the second terminal device described above, the transceiver component may be configured to perform S33 in the embodiment shown in FIG. 3 and/or another process used to support the technology described in this specification. For example, a transceiver component is a communications interface. If the communications apparatus 1000 is a first terminal device or a second terminal device, the communications interface may be a transceiver in the first terminal device or the second terminal device, for example, a transceiver 802 or a transceiver 902. The transceiver is, for example, a radio frequency transceiver component in the first terminal device or the second terminal device. Alternatively, if the communications apparatus 1000 is a chip disposed in the first terminal device or the second terminal device, the communications interface may be an input/output interface of the chip, for example, an input/output pin.

Figure 10B:
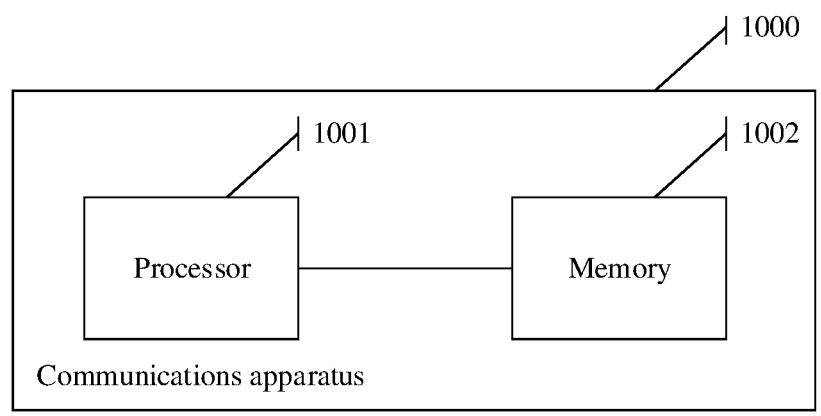

In an optional implementation, the communications apparatus 1000 may further include a memory 1002. Referring to FIG. 10B, the memory 1002 is configured to store computer programs or instructions, and the processor 1001 is configured to decode and execute the computer programs or the instructions. It should be understood that the computer programs or instructions may include function programs of the first terminal device or the second terminal device. When function programs of the first terminal device are decoded and executed by the processor 1001, the first terminal device can implement the functions of the first terminal device in the method provided in the embodiment shown in FIG. 3 in the embodiments of this application. When function programs of the second terminal device are decoded and executed by the processor 1001, the second terminal device can implement the functions of the second terminal device in the method provided in the embodiment shown in FIG. 3 in the embodiments of this application.

In another optional implementation, the function programs of the first terminal device or the second terminal device are stored in an external memory of the communications apparatus 1000. When the function programs of the first terminal device are decoded and executed by the processor 1001, the memory 1002 temporarily stores some or all content of the function programs of the first terminal device. When the function programs of the second terminal device are decoded and executed by the processor 1001, the memory 1002 temporarily stores some or all content of the function programs of the second terminal device.

In another optional implementation, the function programs of the first terminal device or the second terminal device are configured to be stored in the internal memory 1002 of the communications apparatus 1000. When the function programs of the first terminal device are stored in the internal memory 1002 of the communications apparatus 1000, the communications apparatus 1000 may be disposed in the first terminal device in the embodiments of this application. When the function programs of the second terminal device are stored in the internal memory 1002 of the communications apparatus 1000, the communications apparatus 1000 may be disposed in the second terminal device in the embodiments of this application.

In still another optional implementation, some content of the function programs of the first terminal device is stored in an external memory of the communications apparatus 1000, and some other content of the function programs of the first terminal device is stored in the internal memory 1002 of the communications apparatus 1000. Alternatively, some content of the function programs of the second terminal device is stored in an external memory of the communications apparatus 1000, and some other content of the function programs of the second terminal device is stored in the internal memory 802 of the communications apparatus 1000.

In the embodiments of this application, the communications apparatus 800, the communications apparatus 900, and the communications apparatus 1000 are presented in a form in which each function module is obtained through division based on each corresponding function, or may be presented in a form in which each function module is obtained through division in an integrated manner. The "module" herein may be an ASIC, a processor and a memory that execute one or more software or firmware programs, an integrated logic circuit, and/or another component that can provide the foregoing functions.

In addition, the communications apparatus 800 provided in the embodiment shown in FIG. 8 may alternatively be implemented in another form. For example, the communications apparatus includes a processing module and a transceiver module. For example, the processing module may be implemented by using the processor 801, and the transceiver module may be implemented by using the transceiver 802. The processing module may be configured to perform S31 in the embodiment shown in FIG. 3 and/or another process used to support the technology described in this specification. The transceiver module may be configured to perform S33 in the embodiment shown in FIG. 3 and/or another process used to support the technology described in this specification.

For example, the processing module is configured to determine, based on first information, at least one of a quantity or a position of m DMRSs carried on a PSSCH, where m is a positive integer, and the first information includes at least one of a subcarrier spacing, duration of the PSSCH, or a channel coherence time.

The transceiver module is configured to send the m DMRSs to a second terminal device.

All related content of steps in the foregoing method embodiments may be cited in function descriptions of corresponding function modules, and details are not described herein again.

The communications apparatus 900 provided in the embodiment shown in FIG. 9 may alternatively be implemented in another form. For example, the communications apparatus includes a processing module and a transceiver module. For example, the processing module may be implemented by using the processor 901, and the transceiver module may be implemented by using the transceiver 902. The processing module may be configured to perform S32 in the embodiment shown in FIG. 3 and/or another process used to support the technology described in this specification. The transceiver module may be configured to perform S33 in the embodiment shown in FIG. 3 and/or another process used to support the technology described in this specification.

For example, the processing module is configured to determine, based on first information, at least one of a quantity or a position of m DMRSs carried on a PSSCH, where m is a positive integer, and the first information includes at least one of a subcarrier spacing, duration of the PSSCH, or a channel coherence time.

The transceiver module is configured to receive the m DMRSs from a first terminal device.

All related content of steps in the foregoing method embodiments may be cited in function descriptions of corresponding function modules, and details are not described herein again.

The communications apparatus 800, the communications apparatus 900, and the communications apparatus 1000 provided in the embodiments of this application may be configured to perform the method provided in the embodiment shown in FIG. 3. Therefore, for technical effects that can be achieved by the communications apparatuses, refer to the foregoing method embodiments. Details are not described herein again.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided to a processor of a general-purpose computer, a special-purpose computer, an embedded processor, or another programmable data processing device to generate a machine, so that instructions that are executed by a processor of a computer or another programmable data processing device generate an apparatus configured to implement a specified function in one or more processes in the flowcharts and/or in one or more blocks in the block diagrams.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another readable storage medium. For example, the computer instructions may be transmitted from a website, a computer, a server, or a data center in a wired (for example, coaxial cable, optical fiber, digital subscriber line (DSL)) manner or a wireless (for example, infrared, radio, or microwave) manner to another website, computer, server, or data center. The computer-readable storage medium may be any usable medium accessible by a computer, or a data storage device, such as a server or a data center, including one or more usable mediums that are integrated. The usable medium may be a magnetic medium (for example, a floppy disk, a hard disk, or a magnetic tape), an optical medium (for example, a digital versatile disc (DVD)), a semiconducting medium (for example, a solid-state drive (SSD)), or the like.

It is clear that, a person skilled in the art can make various modifications and variations to the embodiments of this application without departing from the spirit and scope of this application. In this way, this application is intended to cover these modifications and variations of the embodiments of this application provided that they fall within the scope of protection defined by the following claims and their equivalent technologies.

What is claimed is:

1. A method, applied in a first terminal apparatus or a chip in the first terminal apparatus, the method comprising:
   determining a position of at least one demodulation reference signal (DMRS) to be carried on a physical sidelink shared channel (PSSCH), the determining being based on a duration of the PSSCH and a preconfigured correspondence between the position of the at least one DMRS and the duration of the PSSCH, and wherein the preconfigured correspondence comprises:
      when the duration of the PSSCH is 13 symbols, the at least one DMRS comprises three DMRSs, and the three DMRSs occupy symbols whose sequence numbers are 1, 6 and 11;
      when the duration of the PSSCH is 9 symbols, the at least one DMRS comprises three DMRSs, and the three DMRSs occupy symbols whose sequence numbers are 1, 4 and 7; or
      when the duration of the PSSCH is 10 or 11 symbols, the at least one DMRS comprises four DMRSs, and the four DMRSs occupy symbols whose sequence numbers are 1, 4, 7 and 10; and
   sending the at least one DMRS to a second terminal apparatus.

2. The method according to claim 1, wherein a first symbol in the PSSCH is not occupied by a first DMRS of the at least one DMRS.

3. The method according to claim 1, wherein a first DMRS of the at least one DMRS occupies a second symbol in the PSSCH.

4. The method according to claim 1, wherein a first symbol in the PSSCH is allocated for automatic gain control.

5. A method, applied in a second terminal apparatus or a chip in the second terminal apparatus, comprising:
   determining a position of at least one demodulation reference signal (DMRS) to be carried on a physical sidelink shared channel (PSSCH), the determining being based on a duration of the PSSCH and a preconfigured correspondence between the position of the at least one DMRS and the duration of the PSSCH, wherein the preconfigured correspondence comprises:
      when the duration of the PSSCH is 13 symbols, the at least one DMRS comprises three DMRSs, and the three DMRSs occupy symbols whose sequence numbers are 1, 6 and 11;
      when the duration of the PSSCH is 9 symbols, the at least one DMRS comprises three DMRSs, and the three DMRSs occupy symbols whose sequence numbers are 1, 4 and 7; or
      when the duration of the PSSCH is 10 or 11 symbols, the at least one DMRS comprises four DMRSs, and the four DMRSs occupy symbols whose sequence numbers are 1, 4, 7 and 10; and receiving the at least one DMRS from a first terminal apparatus.

6. The method according to claim 5, wherein a first symbol in the PSSCH is not occupied by a first DMRS of the at least one DMRS.

7. The method according to claim 5, wherein a first DMRS of the at least one DMRS occupies a second symbol in the PSSCH.

8. The method according to claim 5, wherein a first symbol in the PSSCH is allocated for automatic gain control.

9. An apparatus, comprising:
one or more processors; and
a non-transitory memory, wherein the memory stores instructions, and when executing the instructions stored in the memory, the apparatus executes operations comprising:
   determining a position of at least one demodulation reference signal (DMRS) to be carried on a physical sidelink shared channel (PSSCH), the determining being based on a duration of the PSSCH and a preconfigured correspondence between the position of the at least one DMRS and the duration of the PSSCH, wherein the preconfigured correspondence comprises:
      when the duration of the PSSCH is 13 symbols, the at least one DMRS comprises three DMRSs, and the three DMRSs occupy symbols whose sequence numbers are 1, 6 and 11;
      when the duration of the PSSCH is 9 symbols, the at least one DMRS comprises three DMRSs, and the three DMRSs occupy symbols whose sequence numbers are 1, 4 and 7; or
      when the duration of the PSSCH is 10 or 11 symbols, the at least one DMRS comprises four DMRSs, and the four DMRSs occupy symbols whose sequence numbers are 1, 4, 7 and 10; and
   sending the at least one DMRS to a second terminal apparatus.

10. The apparatus according to claim 9, wherein a first symbol in the PSSCH is not occupied by a first DMRS of the at least one DMRS.

11. The apparatus according to claim 9, wherein a first DMRS of the at least one DMRS occupies a second symbol in the PSSCH.

12. The apparatus according to claim 9, wherein a first symbol in the PSSCH is allocated for automatic gain control.

13. An apparatus, comprising:
one or more processors; and
a memory, wherein the memory stores instructions, and when executing the instructions stored in the memory, the apparatus executes operations comprising:
   determining a position of at least one demodulation reference signal (DMRS) to be carried on a physical sidelink shared channel (PSSCH), the determining being based on a duration of the PSSCH and a preconfigured correspondence between the position of the at least one DMRS and the duration of the PSSCH, wherein the preconfigured correspondence comprises:
      when the duration of the PSSCH is 13 symbols, the at least one DMRS comprises three DMRSs, and the three DMRSs occupy symbols whose sequence numbers are 1, 6 and 11;
      when the duration of the PSSCH is 9 symbols, the at least one DMRS comprises three DMRSs, and the three DMRSs occupy symbols whose sequence numbers are 1, 4 and 7; or
      when the duration of the PSSCH is 10 or 11 symbols, the at least one DMRS comprises four DMRSs, and the four DMRSs occupy symbols whose sequence numbers are 1, 4, 7 and 10; and
   receiving the at least one DMRS from a first terminal apparatus.

14. The apparatus according to claim 13, wherein a first symbol in the PSSCH is not occupied by a first DMRS of the at least one DMRS.

15. The apparatus according to claim 13, wherein a first DMRS of the at least one DMRS occupies a second symbol in the PSSCH.

16. The apparatus according to claim 13, wherein a first symbol in the PSSCH is allocated for automatic gain control.

17. The method according to claim 1, further comprising:
determining, based on the duration of the PSSCH, a quantity DMRSs of the at least one DMRS to be carried on the PSSCH.

18. The method according to claim 5, further comprising:
determining, based on the duration of the PSSCH, a quantity of DMRSs of the at least one DMRS to be carried on the PSSCH.

19. The apparatus according to claim 9, wherein the operations further comprise:
determining, based on the duration of the PSSCH, a quantity of DMRSs of the at least one DMRS to be carried on the PSSCH.

20. The apparatus according to claim 13, wherein the operations further comprise:
determining, based on the duration of the PSSCH, a quantity of DMRSs of the at least one DMRS to be carried on the PSSCH.

* * * * *